US008650079B2

(12) United States Patent
Fano et al.

(10) Patent No.: US 8,650,079 B2
(45) Date of Patent: Feb. 11, 2014

(54) PROMOTION PLANNING SYSTEM

(75) Inventors: Andrew E. Fano, Lincolnshire, IL (US); Chad M. Cumby, Chicago, IL (US); Rayid Ghani, Evanston, IL (US); Marko Krema, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 1265 days.

(21) Appl. No.: 11/069,113

(22) Filed: Feb. 28, 2005

(65) Prior Publication Data

US 2005/0189414 A1    Sep. 1, 2005

Related U.S. Application Data

(60) Provisional application No. 60/548,261, filed on Feb. 27, 2004.

(51) Int. Cl.
*G06Q 30/00*    (2012.01)

(52) U.S. Cl.
USPC .................... 705/14.43; 705/14.49; 705/7.37

(58) Field of Classification Search
USPC .................. 705/14, 26, 39, 10, 7; 235/383
See application file for complete search history.

(56) References Cited

U.S. PATENT DOCUMENTS

| | | | |
|---|---|---|---|
| 6,026,370 A | 2/2000 | Jermyn | |
| 6,029,139 A * | 2/2000 | Cunningham et al. | 705/7.29 |
| 6,123,259 A | 9/2000 | Ogasawara | |
| 6,457,005 B1 | 9/2002 | Torrey | |
| 6,491,217 B2 | 12/2002 | Catan | |
| 6,611,811 B1 | 8/2003 | Deaton et al. | |
| 6,837,436 B2 | 1/2005 | Swartz et al. | |
| 6,976,000 B1 | 12/2005 | Manganaris et al. | |
| 6,988,076 B2 * | 1/2006 | Ouimet | 705/7 |
| 7,092,929 B1 * | 8/2006 | Dvorak et al. | 705/28 |
| 7,188,080 B1 | 3/2007 | Walker et al. | |
| 7,379,890 B2 * | 5/2008 | Myr et al. | 705/10 |
| 2001/0014868 A1 * | 8/2001 | Herz et al. | 705/14 |
| 2002/0123930 A1 * | 9/2002 | Boyd et al. | 705/14 |
| 2002/0133407 A1 | 9/2002 | Walker et al. | |
| 2002/0143608 A1 | 10/2002 | Brown | |
| 2002/0161779 A1 | 10/2002 | Brierley et al. | |
| 2002/0184109 A1 | 12/2002 | Hayet et al. | |
| 2002/0194062 A1 * | 12/2002 | Linde | 705/14 |

(Continued)

FOREIGN PATENT DOCUMENTS

| | | |
|---|---|---|
| EP | 0 697 670 A1 | 2/1996 |
| JP | 10307808 | 11/1998 |
| WO | WO 02/37366 A2 | 2/2002 |

OTHER PUBLICATIONS

Google search "define: system".*

(Continued)

*Primary Examiner* — Matthew L Hamilton
(74) *Attorney, Agent, or Firm* — Fish & Richardson P.C.

(57) ABSTRACT

A method and system for using individualized customer models when operating a retail establishment is provided. The individualized customer models may be generated using statistical analysis of transaction data for the customer, thereby generating sub-models and attributes tailored to customer. The individualized customer models may be used in any aspect of a retail establishment's operations, ranging from supply chain management issues, inventory control, promotion planning (such as selecting parameters for a promotion or simulating results of a promotion), to customer interaction (such as providing a shopping list or providing individualized promotions).

11 Claims, 14 Drawing Sheets

(56) References Cited

U.S. PATENT DOCUMENTS

| | | | |
|---|---|---|---|
| 2003/0028415 A1* | 2/2003 | Herschap et al. | 705/10 |
| 2003/0033190 A1* | 2/2003 | Shan et al. | 705/10 |
| 2003/0130883 A1 | 7/2003 | Schroeder et al. | |
| 2003/0187708 A1* | 10/2003 | Baydar et al. | 705/7 |
| 2003/0187738 A1* | 10/2003 | Baydar | 705/14 |
| 2003/0195793 A1* | 10/2003 | Jain et al. | 705/10 |
| 2004/0122735 A1* | 6/2004 | Meshkin | 705/14 |
| 2005/0080683 A1 | 4/2005 | Jordan | |
| 2005/0273380 A1 | 12/2005 | Schroeder et al. | |
| 2006/0206395 A1 | 9/2006 | Vallabh | |
| 2007/0067213 A1 | 3/2007 | Brown | |

OTHER PUBLICATIONS

Asthana, Abhaya and Krzyzanowski, Paul, "A Small Domain Communications System for Personalized Shopping Assistance," AT&T Bell Laboratories, Murray Hill, New Jersey 07922, ICPWC'94, IEEE 1994, pp. 199-203.

Adomavicius, et al. "Using Data Mining Methods to Build Customer Profiles" IEEE Computer 34(2): 74-82, Feb. 2001, 9 pages.

Agrawal, "Fast Algorithms for Mining Association Rules". In. Proc. of 20$^{th}$ Int'l Conference on Very Large Data Bases, Santiago, Chile 1994, 13 pages.

Ehrenberg, "Repeat-Buying: Facts, Theory, and Applications" Charles Griffin & Company, Limited, London 1998 pp. 1-16 and 103-111.

Foster, Examiner in U.S. Appl. No. 11/069,472, non-final Office Action dated Jun. 19, 2008, to be published by the United States Patent and Trademark Office, 22 pages.

Foster, Examiner in U.S. Appl. No. 11/069,472, Final Office Action dated Dec. 19, 2008, to be published by the United States Patent and Trademark Office, 22 pages.

Hamilton, Examiner in U.S. Appl. No. 11/069,472, Final Office Action dated May 14, 2009, to be published by the United States Patent and Trademark Office, 23 pages.

Hamilton, Examiner in U.S. Appl. No. 11/069,472, non-Final Office Action dated Oct. 21, 2009, to be published by the United States Patent and Trademark Office, 21 pages.

Hamilton, Examiner in U.S. Appl. No. 11/069,472, Final Office Action dated Jun. 24, 2010, to be published by the United States Patent and Trademark Office, 19 pages.

Quinlan, J.R. "C4.5: Programs for Machine Learning", Morgan Kaufmann Publishers Inc., San Francisco, CA USA 1993, pp. 1-26.

Hamilton, Examiner in U.S. Appl. No. 11/069,472, Non-Final Office Action dated Nov. 17, 2010, to be published by the United States Patent and Trademark Office, 23 pages.

Hamilton, Examiner in U.S. Appl. No. 11/069,472, Notice of Allowance dated Mar. 4, 2011, to be published by the United States Patent and Trademark Office, 14 pages.

Hamilton, Examiner in U.S. Appl. No. 13/099,424 on Jan. 13, 2012, 15 pages.

Hamilton, Examiner in U.S. Appl. No. 13/332,590 on Mar. 16, 2012, 21 pages.

Hamilton, Examiner in U.S. Appl. No. 13/099,424 on Jun. 27, 2011, 16 pages.

Hamilton, Examiner in U.S. Appl. No. 13/332,590 on Jun. 5, 2012, 28 pages.

Bellamy, Rachel; Swart, Calvin; Kellogg, Wendy A.; Richards, John; and Brezin, Jonathan, IBM T.J. Watson Research Center, "Designing an E-Grocery Application for a Palm Computer: Usability and Interface Issues," http://www.comsoc.org/%7Edl/jhtmls/ieee/comm/pc/2001008/04aug/ . . . , 9 pages, Aug. 2001.

Blum, Avrim; Frieze, Alan; Kannan, Ravi; and Vempala, Santosh, "A Polynomial-time Algorithm for Learning Noisy Linear Threshold Functions," (an earlier version of this paper appeared in the 37$^{th}$ Symp. on Foundations of Computer Science, 1996), 18 pages.

Brijs, Tom; Swinnen, Gilbert; VanHoof, Koen; Wets, Geert, "Using Association Rules for Product Assortment Decisions: A Case Study," Limburg University Centre, Department of Applied Economic Sciences, B-3590 Diepenbeek, Belgium, ACM 1999 1-58113-143-7/99/08, 7 pages.

Carlson, Andrew J.; Cumby, Chad M.; Rizzolo, Nicholas D.; Rosen, Jeff L.; and Roth, Dan, "SNoW User Manual," Cognitive Computation Group, Computer Science Department, University of Illinois, Urbana-Champaign, Urbana, Illinois, first version: May 1999, current version: Jan. 2004, 49 pages.

Cohen, Edith, "Learning Noisy Perceptrons by a Perceptron in Polynomial Time," AT&T Labs-Research, Florham Park, NJ 07932, edith@research.att.com.http://www.research.att.com/~edith, 10 pages, Oct. 1997.

Geyer-Schulz, Andreas; Hahsler, Michael; and Jahn, Maxmilliam, "A Customer Purchase Incidence Model Applied to Recommender Services," Geyer-Schulz: Informationsdienste and Electronische Märkte, Geb. 20.20 Rechenzentrum, Universität Karlsruhe (TH), D-76128 Karlsruhe, Germany; Hahsler and Jahn: Informationswirtschaft, WU-Wien, A-1090 Wien, Austria, 11 pages, 2001.

McCallum, Andrew; Rosenfeld, Ronald; Mitchell, Tom; and Ng, Andrew Y., "Improving Text Classification by Shrinkage in a Hierarchy of Classes," McCallum: Just Research, 4616 Henry Street, Pittsburgh, PA, 15213; Rosenfeld and Mitchell: School of Computer Science, Carnegie Mellon University, Pittsburgh, PA 15213; NG: MIT AI Lab, 545 Technology Square, Cambridge, MA 02139, 9 pages, 1998.

Newcomb, Erica; Pashley, Toni; Stasko, John, "Mobile Computing in the Retail Arena," Letters CHI, vol. No. 5, Issue No. 1, Paper: Designing Applications for Handheld Devices, Ft. Lauderdale, Florida, USA, Apr. 5-10, 2003, pp. 337-344.

Roth, Dan, "Learning in Natural Language," Department of Computer Science, University of Illinois at Urbana-Champaign, Urbana, IL, 61801, IJCAI'99, 7 pages, 1999.

Bellamy, Rachel; Swart, Calvin; Kellogg, Wendy A.; Richards, John; and Brezin, Jonathan, IBM T.J. Watson Research Center, "Designing an E-Grocery Application for a Palm Computer: Usability and Interface Issues," http://www.comsoc.org/%7Edl/jhtmls/ieee/comm/pc/2001008/04aug/ . . . , 9 pages, Aug. 2001.

Cohen, Edith, "Learning Noisy Perceptrons by a Perceptron in Polynomial Time," AT&T Labs-Research, Florham Park, NJ 07932, edith@research.att.com http://www.research.att.com/~edith, 10 pages, Oct. 1997.

* cited by examiner

PROMOTION PLANNING SYSTEM

CROSS REFERENCE TO RELATED APPLICATION

This application claims the benefit of U.S. Provisional Application Ser. No. 60/548,261, entitled "Predicting Customer Grocery Shopping Lists From POS Purchase Data," filed on Feb. 27, 2004, which is hereby incorporated by reference herein in its entirety.

BACKGROUND

Retailers have been collecting large quantities of point-of-sale data in many different industries. One area that has been particularly active in terms of collecting this type of data is grocery retailing. Loyalty card programs at many grocery chains have resulted in the capture of millions of transactions and purchases directly associated with the customers making them.

Despite this wealth of data, the perception in the grocery industry is that this data has been of little use. The data collection systems have been in place for several years but systems to make sense of this data and create actionable results have not been very successful. There have been efforts to utilize the retail transaction data. For example, research in mining association rules (R. Agrawal and R. Srikant, *Fast algorithms for mining association rules. In Proc. of* 20*th Int'l Conference on Very Large Data Bases*, Santiago, Chile, 1994) has led to methods to optimize product assortments within a store by mining frequent item-sets from basket data (T. Brijs, G. Swinnen, K. Vanhoof, and G. Wets, *Using association rules for product assortment decisions: A case study. In Knowledge Discovery and Data Mining*, pages 254-260, 1999). Customer segmentation has been used with basket analysis in the direct marketing industry for many years to determine which customers to send mailers to. Additionally, a line of research based on marketing techniques developed by Ehrenberg (A. Ehrenberg, *Repeat-Buying: Facts, Theory, and Applications*, Charles Griffin & Company Limited, London, 1988) seeks to use a purchase incidence model with anonymous data in a collaborative filtering setting (A. Geyer-Schulz, M. Hahsler, and M. Jahn, *A customer purchase incidence model applied to recommender systems*, in WebKDD2001 Workshop, San Francisco, Calif., August 2001).

Traditionally, most of the data mining work using retail transaction data has focused on approaches that use clustering or segmentation strategies. Each customer is "profiled" based on other "similar" customers and placed in one (or more) clusters. This is usually done to overcome the data sparseness problem and results in systems that are able to overcome the variance in the shopping behaviors of individual customers, while losing precision on any one customer.

A major reason that individually targeted applications have not been more prominent in retail data mining research is that in the past there has been no effective individualized channel to the customer for brick & mortar retailers. Direct mail is coarse-grained and not very effective as it requires the attention of customers at times when they are not shopping and may not be actively thinking about what they need. Coupon based initiatives given at checkout-time are seen as irrelevant as they can only be delivered after the point of sale. Studies have shown that grocers lose out on potentially 11% of sales due to forgotten items, which highlights the need to find effective individual channels to customers at the point of sale prior to check out.

With the advent of PDA's and shopping cart mounted displays, such as the model Symbol Technologies is piloting with a New England grocer, retailers are in a position now to deliver personalized information to each customer at several points in the store. In fact, a few systems have been developed and attempt to deliver personalized information to customers. For example, the IBM Easi-Order system allows a list to be developed on a customer's PDA, which is then sent to the store to be compiled and picked up. (R. Bellamy, J. Brezin, W. Kellogg, and J. Richards, *Designing an e-grocery application for a palm computer: Usability and interface issues*, IEEE Communications, 8(4), 2001). In a system developed at Georgia Tech, a PDA was used as a shopping aide during a shopping trip to show locations and information on items in a list (E. Newcomb, T. Pashley, and J. Stasko, *Mobile computing in the retail arena*, in Proceedings of the conference on Human factors in computing systems (CHI2003), pages 337-344. ACM Press, 2003). In each of the IBM and Georgia Tech systems, the shopping list was emphasized as the essential artifact of a grocery trip, enabling all other interactions. Both also stated as a design goal that it should be possible to compile or augment a shopping list per customer based on previous purchase history. In another example, the 1:1Pro system was designed to produce individual profiles of customer behavior in the form of sets of association rules for each customer which could then be restricted by a human expert (G. Adomavicius and A. Tuzhilin, *Using data mining methods to build customer profiles*, IEEE Computer, 34(2): 74-82, 2001). Despite these efforts, there has not been a thorough experimental attempt to predict and evaluate individually personalized customer shopping lists from transactional data with a large set of customers.

Therefore, given the massive amounts of data presently being captured, and the imprecise predictive ability of clustering and segmentation approaches, there is a need to better utilize the captured data, such as a better prediction of a shopping list. Likewise, there is a need for a system to provide a predictive shopping list to customers using the consumer models using reduced processor resources to be able to deliver the lists locally on mobile processing devices attached to shopping carts. Also, there is a need to better utilize the captured data to provide enhanced promotion and planning for retail establishments and others in the supply chain.

BRIEF SUMMARY

The above needs may be satisfied by the present invention. In one embodiment of the invention, a method and system is provided for individualized communication for a customer includes a customer model creation component configured to create at least a part of the customer model for the customer by statistically analyzing transaction data solely from the customer, a customer identification component configured to determine the identity of the customer, and customer communication component configured to access the customer model and the identity of the customer and to determine a content of a communication based on the at least a part of the customer model.

In a second embodiment of the invention, a method and system is provided that includes a shopping list computing device configured to communicate with a server, a customer identification component, a shopping list prediction component configured to generate a proposed shopping list based on a statistical analysis of the transactional data associated with the customer, and a display component configured to display the proposed shopping list on the mobile computing device.

In a second embodiment of the invention, a product promotion method and system is provided that includes a customer identification component, a customer model comprising a plurality of attributes derived from transaction data associated with the customer, a promotion prediction component configured to select a product, an output device, and a promotion computing device configured to generate a promotion for the selected product based on the attributes in the customer model and to transmit the promotion to the output device, which may be a mobile output device.

In a third embodiment, a promotion planning method and system is provided that includes a parameter selection component configured to select parameters for a promotion by optimizing pre-determined goals of the promotion, a customer selection component communicating with the parameter selection component, the customer selection component configured to select a subset of customers based on the selected parameters, a promotion simulator component communicating with the customer selection component, the promotion simulator component configured to simulate outcomes of the promotion with the selected parameters and the subset of customers, and an output device communicating with the promotion simulator component, the output device configured to present the simulated outcomes.

In a fourth embodiment, a promotion planning method and system is provided that includes a parameter selection component configured to select parameters for a promotion, a customer selection component communicating with the parameter selection component, the customer selection component configured to select a subset of customers based on the selected parameters and based on customer models, at least a portion of each customer model being derived from statistical analysis of customer data consisting of transaction data associated with a respective customer, a promotion simulator component communicating with the customer selection component, the promotion simulator component configured to simulate outcomes of the promotion with the selected parameters, the subset of customers, and the customer models of the subset of customers, and an output device communicating with the promotion simulator component, the output device configured to present the simulated outcomes.

In a fifth embodiment, an inventory planning method and system for a retail establishment is provided that includes a plurality of customer models for customers of the retail establishment, at least a part of each customer model generated by statistical analysis of transactional data for a product category for a respective customer and a inventory planning component accessing the plurality of customer models, the inventory planning component configured to estimate purchases for the product category in a pre-determined period and configured to aggregate the estimated purchases.

The foregoing summary has been provided only by way of introduction. Nothing in this section should be taken as a limitation on the following claims, which define the scope of the invention.

BRIEF DESCRIPTION OF SEVERAL VIEWS OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
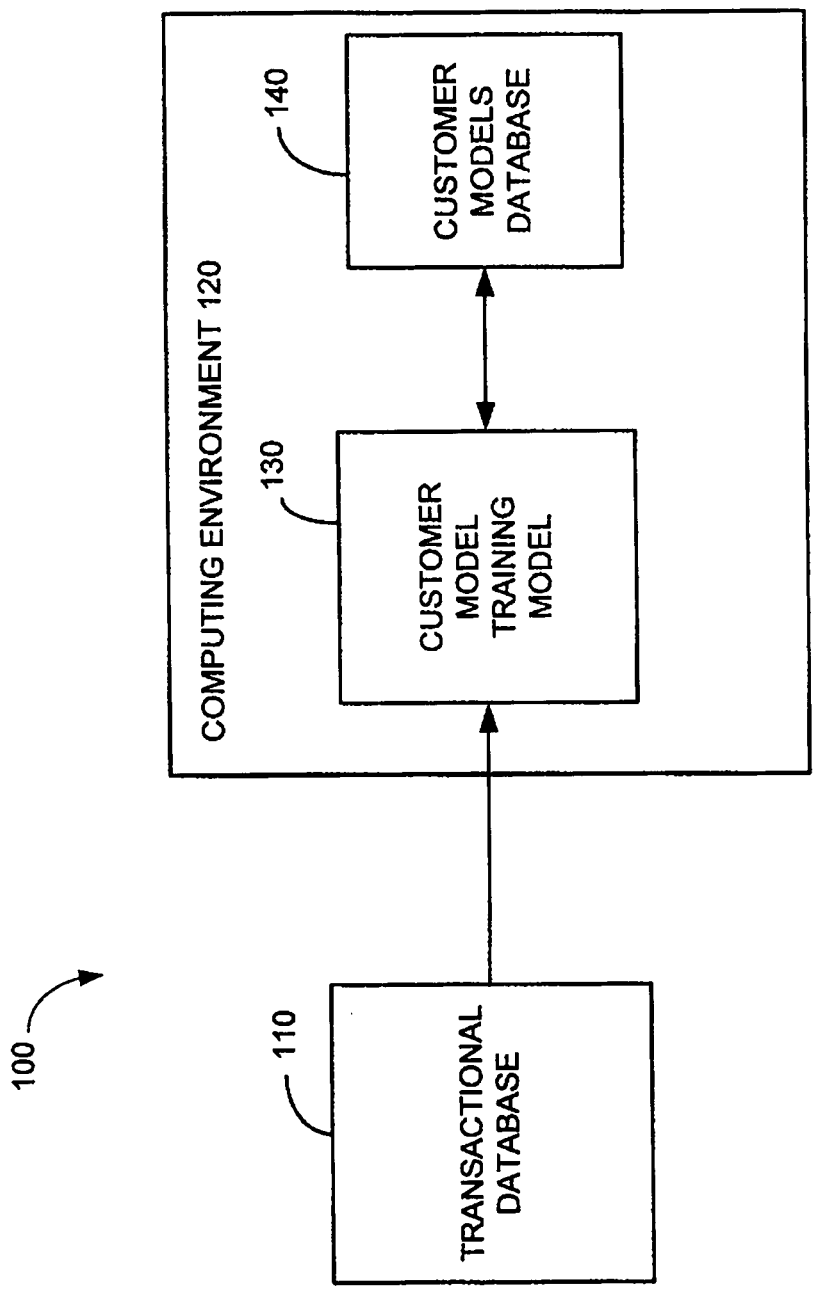
FIG. 1 is a block diagram of a customer model training system.

Any party who offers goods or services may be considered a "retail establishment." Similarly, any party who purchases goods or services may be considered a "customer." Therefore, there are many different types of "retail establishments" and many types of "customers." Examples of retail establishments and customers include: (1) a retail store with the customers being its shoppers; (2) a wholesaler may be considered a retail establishment with the retailers who purchase goods from the wholesaler acting as customers; or (3) a manufacturer may be considered a retail establishment with the parties who purchase the manufactured goods (either retailers, wholesalers, or shoppers) acting as customers. These examples are merely for illustrative purposes.

In any of these retail establishment—customer relationships, the retail establishment typically has many aspects to its operations, ranging from supply chain management issues, inventory control, promotion planning, to customer interaction (such as before, during, or after the retail experience). The retail establishment may wish to improve any one, some, or all of these aspects of its business.

In order to improve on any aspect of its business, customer models may be used. For example, customer models of an individual customer may be derived, at least in part, based on statistical analysis. Parts, or all, of the model may be derived from data solely from the individual customer, such as transaction data from the customer. Data from other customers, such as transaction data, need not be used in compiling parts, or all, of the customer model. The customer model may comprise one or more sub-models, such as a shopping list sub-model, or may comprise one or more attributes, such as behavior, brand loyalty, wallet share, price sensitivity, promotion sensitivity, product substitution, basket variability, frequency of shopping, etc. The customer model may thus be used in any aspect of a retail establishment's operations, ranging from supply chain management issues, inventory control, promotion planning, to customer interaction (such as before, during, or after the retail experience).

One application of the customer model is a shopping list prediction method and system. The shopping list prediction system may estimate product categories that a customer may purchase for a given shopping trip at a retail establishment, such as a grocery store. The estimate may be based on the shopping list sub-model that is statistically derived from transaction data for the specific customer. For example, the shopping list sub-model may be generated using customer data solely from the specific customer. Transaction data from other customers or manual customer input may not be necessary in generating the shopping list sub-model. The customer data, such as customer transaction data, may use statistical analysis to estimate purchase of one, some, or all of the product categories of the retail establishment. Product categories may include any grouping of products including a product class, individual products, or specific types of individual products. And, one or more statistical analyses may be used in generating the shopping list sub-model, such as rule-based and machine learning statistical analyses. The shopping list sub-model may be generated prior to the given shopping trip and updated with current parameters (such as current date, time, etc.) or may be generated concurrently with the given shopping trip.

Another application of the customer model is a product promotion method and system for a retail establishment, such as a grocery store. A product category may be suggested for purchase, such as a suggestion from a shopping list system. Based on one or more attributes of the customer model, the product promotion system and method may determine whether and/or what type of promotion a customer may receive for the product category. The attributes may be statistically derived from solely from a customer's transaction data and may include behavior, brand loyalty, wallet share, price sensitivity, promotion sensitivity, product substitution, basket variability, and frequency of shopping. Further, the product promotion method and system may bill for promotions provided to customers. The billing may be for an impression of the promotion to the customer or may be for acceptance of the promotion. Moreover, the billing may be independent of or dependent on the customer who is provided the promotion. For example, the billing may depend on one or more attributes in the customer model for the customer receiving the impression or accepting the promotion. Or, the billing may depend on the goals of the promotion, such as brand, revenue, lift, and market share. For example, the billing may depend on whether a brand switch or a brand extension has occurred.

Still another application of the customer model is a promotion planning method and system for a retail establishment, such as a grocery store. A promotion may have stated goals and may have certain parameters. Examples of goals of a promotion may include brand, revenue, lift, and market share. Examples of parameters include duration of the promotion, type of promotion, amount of promotion, characteristics of customers targeted, etc. The promotion planning method and system may select the parameters of the promotion to optimize, such as local or global optimization, of one or more of the stated goals. The promotion planning method and system may use the customer models in order to determine which subset of customers to select for the promotion based on the selected parameters. Further, the promotion planning method and system may simulate the promotion with the subset of customers and the selected parameters using the customer models. The simulation may include any one, some, or all of: number of expected visits; number of expected impressions; average number of impressions per switch; brand switches because of the promotion; brand extensions because of the promotion; new trials of the product; non-promotion volume; the promotion volume; promotion cost; discount per impression; the cost per switch; the revenues from the promotion; and incremental profit for a predetermined number of replenishment cycles due to the promotion. Based on the output of the simulation, new parameters for the promotion may be selected, and the simulation may iterate with the new parameters.

Another application of the customer model is an inventory planning method and system for a retail establishment, such as a grocery store. The inventory planning method and system may use the customer models for customers of the retail establishment in order to estimate purchases of a product category for a predetermined period. The estimated purchases of the product for the individual customers may be summed in order to provide an estimate for the predetermined period. Moreover, those customers of the retail establishment who do not have an individual customer model may be assigned an average customer model, thereby accounting for all potential customers of a retail establishment. The average customer model may use data from a plurality of customers, such as transaction data for all customers for the product category or data for a subset of customers for the product category.

I. Customer Interaction

A retail establishment may wish to interact with its customers in order to meet any pre-defined criteria such as increased sales, increased profit, improved service, etc., as discussed in more detail below. One method to improve the interaction between the retail establishment and the customer is to generate individual customer profiles, and to use the profiles for various aspects of the retail establishment's operations.

An example of a type of retail establishment is a grocery store. A grocery store has several aspects to its operations, ranging from supply chain management issues, inventory control of the items it sells, promotion planning, to customer interaction (such as before, during, or after the sale). Focusing on customer interaction, for example, grocery stores have attempted to interact with customers for a variety of reasons, such as increasing sales, profit margin, customer loyalty, etc. In order to interact more effectively with the consumer, the grocery store may provide individualized and personalized interactions with customers before the customer enters the store, during shopping as the customer navigates through the store, and after the customer leaves the store. Instead of using traditional approaches, which often fail to be adequately personalized to the individual, one manner to communicate with the customer is to generate an individualized customer model, learning separate classifiers for each customer based on historical transactional data. For example, the transactional data from loyalty card programs in grocery stores may be used to create attributes of a customer model, as discussed in more detail below.

The individualized and personalized interaction may take a variety of forms. One such form is generating a shopping list for the customer. Customers often fail to generate a list for grocery shopping, or if they do, the list may be incomplete. Moreover, prior systems require customer input of selecting items in order to generate the list. In contrast to prior systems, the customer may be presented with a suggested list of items that is based, at least in part, on statistical analysis of the transactional data. The statistical analysis of the transactional data may generate a predicted shopping list for any product category, such as a predicted shopping list for a product class (such as a prediction for yogurt, milk, or eggs), individual products (such as Dannon® yogurt), or specific types of individual products (such as Dannon® 10 ounce strawberry yogurt). The statistical analysis may use models, classifiers, predictors, or the like using the customer's transactional data to generate a predicted shopping list. Moreover, the statistical analysis may be updated every time additional transactional data for the customer is generated. Thus, the shopping list does not require the customer to tag certain items to compile a shopping list. Rather, the shopping list may be derived from (or may be generated solely based on) the transactional data for the customer.

The predicted shopping list benefits the customer in several ways. First, the grocery store provides a valuable service to the customer. Second, by suggesting a realistic shopping list, the customer is reminded of purchases he or she might have otherwise forgotten. These suggestions translate into recovered revenues for the store that might otherwise be transferred to a competitor, or foregone as the customer goes without the item until the next shopping trip. Third, because the list of items is available, promotions may also be provided to the customer related to the list of items (such as a discount to buy a larger size of an item or a different brand of the item). A promotion may be any customer communication designed to promote a sale relating to an item, such as an advertisement for the item, a discount for the item, an advertisement for a related item (such as a substitute product for the item, a brand extension, etc.), a discount for the related item, etc.

Another form of personalized interaction is determining the shopping habits of the customer, and using the shopping habits to better interact with the customer. A few examples of shopping habits, discussed below, include promotion sensitivity, basket variability, price sensitivity, brand loyalty, and wallet share. The listed shopping habits are merely for illustrative purposes. Other shopping habits are also available. Further, the shopping habits may be considered "global" (affecting all items purchased by the customer), may be for a general product (such as promotion sensitivity for milk), or may be for a specific product (such as loyalty to a specific brand of milk).

To individualize and personalize the interaction with the customer, the retail establishment may generate a customer model that is specific to a particular customer. A part, or all, of the customer model may use statistics based on customer data solely from the specific customer (and not from customer data from other customers). This is unlike the statistics used in previous systems, such as clustering or segmentation techniques, which used customer data from other customers.

There are several contexts where the customer data for the specific customer is sufficient to generate a part, of all, of the model. One context is a grocery store, which often records transactions with customers, including data regarding the date of the visit to the store, the items purchased, the price paid, etc. Technology, such as customer relationship management (CRM) technology, has allowed providers to collect large quantities of point-of-sale (POS) data in many different industries. Grocery stores often use loyalty card programs to capture information about millions of transactions and purchases, where such information may be associated with the customers making the transactions and purchases. As discussed below, a training system may use the customer data for a specific customer to create a customer model that is individualized to a particular customer. A runtime system may then use the customer model prior to, during, or after shopping in a variety of ways, such as generating shopping lists or providing promotions, in order to individualize and personalize the interaction with the customer.

A. Training System for Customer Model

In the drawings where like reference numerals refer to like elements, FIG. 1 is a block diagram of a customer model training system 100. The training system 100 may use a training transactional database 110 that contains historical shopping data for a plurality of customers. The historical shopping data may include: name of the customer, address, dates and times of shopping events, items purchase and price paid for shopping events, promotional offers received (including offers accepted and rejected), etc. Other historical data may be included in the training transactional database 110. Though the training transactional database 110 is depicted as one block, the data may be resident in a single database or may reside in multiple databases. The training system further includes a computing environment 120. The computing environment 120 may comprise a general purpose computing device which performs arithmetic, logic and/or control operations. As shown in FIG. 1, the computing environment 120 includes a customer model training module 130 and a customer models database 140. The customer model training module 130 may receive data from the training transactional database 110, and may compile attributes of a specific customer to store in the customer models database 130.

As discussed in more detail below, the customer model for a specific customer may be composed of sub-models or attributes of the user. The attributes may be derived in a variety of ways, such as by storing data from the training transactional database 110 unmodified or by performing transformations on the data (such as via statistical analysis) to derive attributes which are specific to the individual customer. For example, attributes may comprise identification information (e.g., name, age, postal address, telephone number, e-mail address, etc.) and may comprise derived statistical information (such as attributes directed to behavior, brand loyalty, wallet share, price sensitivity, promotion sensitivity, product substitution, basket variability, frequency of shopping, etc.). Moreover, the customer model may comprise sub-models, classifiers, or predictors for a predicted shopping list for the customer. As discussed above, the attributes of the model may be global to the shopping habits of an individual customer (such as basket variability), may be for a general product (such as hoarding of milk), or may be for a specific product (such as loyalty to a specific brand yogurt).

Figure 2:
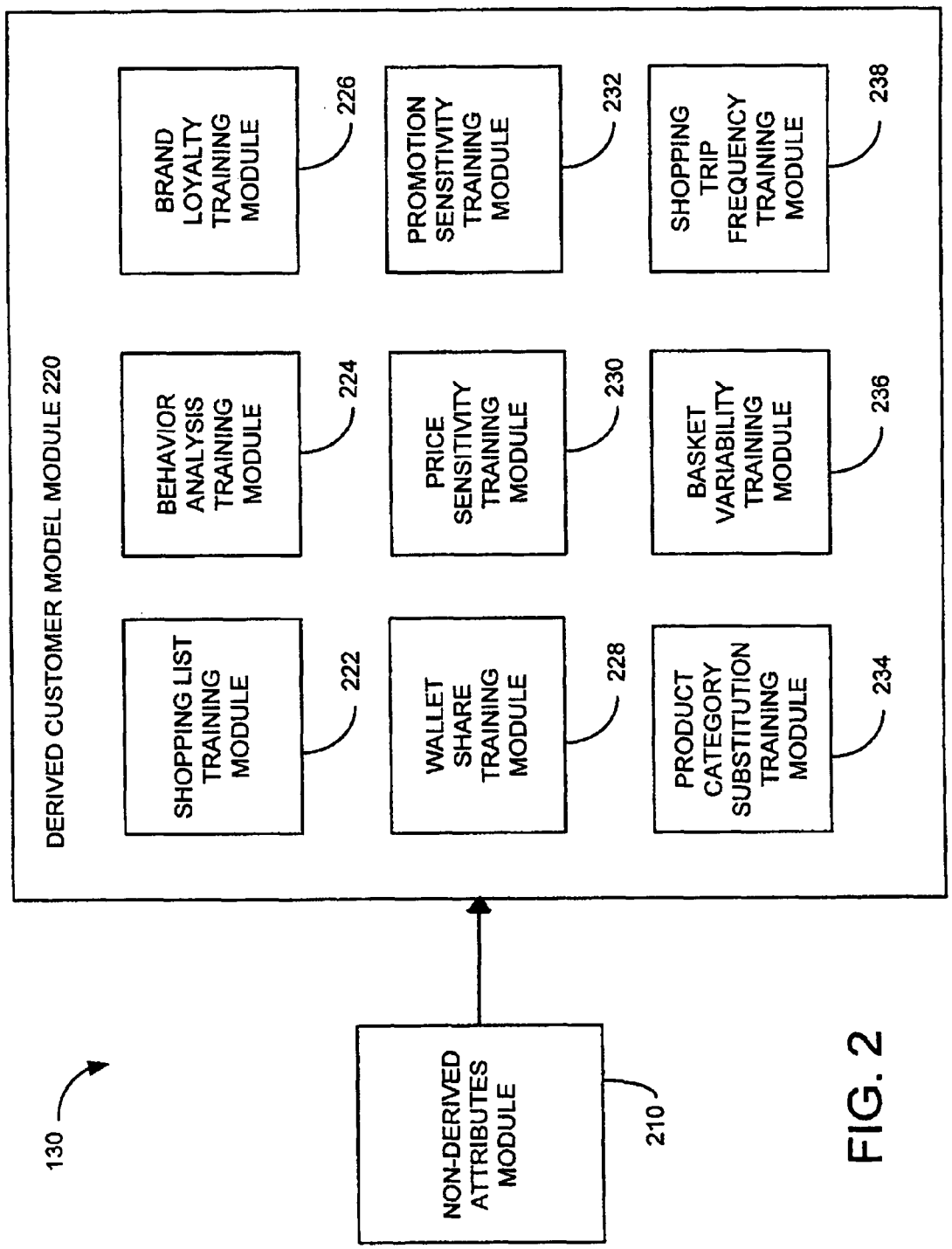
FIG. 2 is an expanded block diagram of customer model training model in the customer model training system depicted in FIG. 1.

Referring to FIG. 2, there is show an expanded block diagram of customer model training module 120. The customer model training module 130 may create attributes for a model of a specific customer by performing various operations on the data received from the training transactional database 110, such as storing the data unmodified and creating new attributes or sub-models derived from the data (such as based on statistical analysis of the data). FIG. 2 shows a series of modules which may be performed in creating a customer model. Though a specific sequence for execution of the modules is shown, the modules may be executed in any sequence.

A non-derived attributes module 210 may be executed, as shown in FIG. 2. The non-derived attributes module 210 may generate attributes of the customer model which do not require any conversion of the content of the data. The non-derived attributes 210 may include customer identification information, such as the customer's name, address, telephone number, e-mail address, etc. This data may be included in the training transactional database 110, and may be stored in unmodified form in the customer model. Moreover, the customer model training module 130 may further execute derived customer model module 220. This module may derive sub-models or attributes from the raw data from the training transactional database 110. One, some, or all of the sub-models or attributes derived from statistical analysis may be based solely on customer data for the specific individual and/or may be without any manual or explicit input from the customer. Further, the customer model training module 120 may be updated at any time, including after any one or all shopping trips. Thus, after runtime, a new set of transactions may occur. Based on these transactions, the customer model may be updated.

i. Shopping List Sub-Model of Customer Model

One such sub-model of the customer model is a shopping list sub-model, which may be generated by the shopping list training module 222. The shopping list training, module 222 may generate a sub-model that includes classifiers or predictors (such as a statistical probability) that the customer will purchase one, some or all product categories offered for sale by the retail establishment. As discussed above, the product categories may be any grouping of the products offered for sale by the retail establishment, such as a product class, a specific product, or an individual product brand. Therefore, for any customer with sufficient transactional data, a classifier or predictor for some, one or all of the product categories offered for sale by the retail establishment.

As discussed in more detail below, he training module may use methodologies to analyze the transactional data for the customer. For example, each shopping trip may include certain characteristics, such as the day, date, and time of the shopping trip, and whether the product category was purchased or not purchased. The various shopping trips may be analyzed to derive a function using the methodologies described below, with the inputs to the function being, for example, the day, date, and time of the shopping trip, and the output being the probability that the product category may be purchased. At runtime, such as when the customer enters the store, the function may be accessed to predict the probability that the customer will wish to purchase the product category. Inputs to the function may be the day, date and time when the customer enters the store, and the output may be the probability of purchase by the customer.

For example, the shopping list training module 222 may define a set of customers "C", a set of transactions "T" made by those customers, and a fixed set of product categories "P" acquired by those customers. The product categories "P" may be equivalent to those normally used on shopping lists and may be all of the products (of a subset of the products) available for sale at the retail establishment. Within T and P, each individual customer "c" that is included in the set of customers (each c∈C) has associated with it a set of transactions made by that individual customer "$T_c$" (where $T_c \subset T$) and a set of product categories acquired by that individual customer "$P_c$" (where $P_c \subset P$). For each transaction made by an individual customer c, "t" (where t∈$T_c$), the shopping list training module 222 may define a sub-model for the shopping list. The sub-model may then be used at a later time to predict whether that individual customer c will purchase a particular product category $p_i$ (where $p_i \in P_c$) by creating a vector of classifiers y∈$\{0,1\}^{|P_c|}$ (the "prediction vector") where a given classifier $y_i$=1 if, for a given order of all product categories in $P_c$, customer c bought $p_i \in P_c$ in transaction t, and where $y_i$=0 if customer c did not buy $p_i$. Therefore, the shopping list prediction module 110 may formulate the classification of product categories for all customers as |$P_c$| binary classifications for each customer, and may derive a separate classifier for each classification.

As discussed above, the shopping list training module 222 may include one or more methodologies for determining the sub-model of the training list. For example, one or more methodologies may predict the probability that a customer may purchase any product category. Two types of methodologies include rule-based methodologies and machine learning methodologies. These types of statistical analyses are merely for illustrative purposes. Examples of rule-based methodologies include random rule-based, same as last trip rule-based, and top N rule-based.

The random rule-based methodology includes random guessing. Using this method, for each transaction of a given customer, attributes may be related to a prediction vector y' that includes one or more classifiers. Each classifier $y'_i$ may be equal to one of two values, such as 0 or 1, with an equal probability. Products to which a classifier, such as $y'_i$=0, is associated are not included in the shopping list. Similarly, products to which a classifier, such as $y'_i$=1, is associated are included in the shopping list. Therefore, as one example, every product class previously purchased by a particular customer has a 50% chance of being included in the shopping list for the next transaction by that particular customer.

The same-as-last-trip rule-based methodology (also referred to as the "same-as-last-trip predictor"), may produce a model for shopping list that consists of product categories, such as product classes, acquired during a previous transaction. An ordering on the set $T_c$ may be imposed for each customer c corresponding to the temporal sequence of each transaction. Then, for each transaction $t_k$, a prediction vector y' is output equal to the purchase vector seen for transaction $t_{k-1}$.

The top-n rule-based methodology may aggregate all the transactions of a particular customer c, and selects and includes in the shopping list the top n product categories. The rule-based prediction module 212 may rank the product categories according to the quantity of and/or the frequency with which the product categories were acquired list. category For example, if the product categories are ranked according to frequency of acquisition, a new ordering on the set $P_c$ is defined for a particular customer c, which corresponds to the frequency with which each product category is acquired ("freq($p_i$)") within $T_c$. Specifically, for each product category purchased by the customer (each $p_i \in P_c$), the frequency with which a given product category is acquired freq($p_i$) may be defined by the following equation:

$$freq(p_i) = \frac{\sum_{j=1}^{|T_c|} y_i^j}{|T_c|} \quad (1)$$

Therefore, in this example, the top-n rule-based methodology produces for each transaction t a vector y' for which the values corresponding to the top n groupings in $P_c$, as ordered by frequency, are equal to 1, and with all else, equal to 0. A variation on the same-as-last-trip rule-based methodology comprises using only the past m transactions to create the Top N list which may account for some of the temporal changes a customer might exhibit.

As discussed above, another type of methodology is machine learning. There are several examples of machine learning methodologies, such as decision-tree based and linear based methodologies. The examples of machine learning methodologies are merely for illustrative purposes. Other types of machine learning methodologies are possible. In contrast to rule-based prediction, the machine learning determines the |$P_c$| binary classifications using a machine learning technique, such as supervised learning. To determine the |$P_c$| groupings, the machine learning methodology pairs each customer $c_i$ with each product category $p_i$ (where $p_i \in P_c$) to form classes, where each class may be thought of as a customer and product category pair. Therefore, if the available data set includes n customers and q product categories, the machine learning methodology creates n*q classes, and as many binary classifiers (each "$y_i$").

For each of the binary classifiers $y_i$, a classifier may be trained in the supervised learning paradigm to predict whether that category will be bought by that customer in that particular transaction. The following are a series of examples $(x, y_i)$, where x is a vector in $R^n$ for some n, encoding features of a transaction t, with $y_i \in \{0,1\}$ representing the label for each example (i.e., whether the category corresponding to $y_i$ was bought or not).

As discussed above, there are several machine learning methodologies. One machine learning methodology may use decision trees to predict each class label, such as C4.5 (see J. R. Quinlan, *C4.5: Programs For Machine Learning*, Morgan Kaufmann Publishers Inc., San Francisco, Calif., USA 1993). Another machine learning methodology may use linear methods to learn each class, such as Perceptron, Winno, Naive Bayes, Linear Discriminant Analysis, Logistic Regression, Separating Hyperplanes. These linear methods offer several advantages in a real-world setting, most notably the quick evaluation of generated hypotheses and their ability to be trained in an on-line fashion.

In each case, a feature extraction step precedes the learning phase. Information about each transaction t is encoded as a vector in $R^n$. For each transaction, included are properties of the current visit to the store and information about the local history before that date in terms of data about the previous 4 transactions. An assumption is that examples and their labels are not independent, and that one can model this dependence implicitly by including information about the previous visits. This approach is similar to Natural Language Processing for tasks such as part-of-speech tagging, where tags of preceding words are used as features to predict the current tag. The analysis using the 4 previous transactions is merely for illustrative purposes. Fewer or greater transactions may be used.

The features extracted in example $(x_j, y_i^j)$ for a given transaction $t^j$ (the "base features") may include, for example, any combination of the following: the replenishment interval at $t^j$; the frequency of interval at $t^j$; the range into which the current acquisition falls; the day of the week of the current shopping trip; the time of the day for the current transaction, which may be broken down, for example, into six four-hour blocks; the month of the year for the current transaction; and the quarter of the year for the current transaction.

The replenishment interval at $t^j$ may include the number of days at $t^j$ since a product category $p_i$ was acquired. The frequency of interval at $t^j$ may be obtained by, for each product category $p_i$, by building a frequency histogram for the interval at acquisition binned into several ranges (for example, 3-5 days, 7-9 days), and normalizing the frequency histogram by the total number of times the product category was acquired. The range into which the current acquisition falls may be the same as the ranges indicated for the frequency of interval at $t^j$.

For each transaction t, in addition to encoding features of a current transaction, traits from prior transactions (the historical transaction data) may be extracted. These traits from prior transactions may be included in $(x^j; y^j_i)$. For example, the features of four (4) previous transactions $t^{j-1}; t^{j-2}; t^{j-3}; t^{j-4}$, may be included. Additionally, four features may be included with respect to each transaction in the local history including: (1) whether category $p_i$ was bought in this transaction; (2) the total amount spent in this transaction; (3) the total number of items bought in this transaction; and (4) the total discount received in this transaction. These four features are only used for the local history of the current transaction and not for the current transaction itself. As discussed below with respect to the runtime module, at runtime these four features are not available.

If the decision tree methodology is used, the features extracted such as those discussed above, may make up the entire set of features used for training. If the linear methodology is used, it is often difficult to learn a linear separator function using a relatively low-dimensional feature space such as that created by the extracted features. Therefore, in addition to extracting features the features discussed above, additional features are created to improve learnability. In addition, basic attributes from the local history may also be combined to increase the number of features for prior transactions. The basic attributes may be combined according to a non-linear transformation.

Creating the additional attributes effectively increases the dimensionality of each example vector x, and thus the chance of learning a linear function that separates the positive and negative examples. This method is similar to those used to learn classifiers in Natural Language Processing contexts where combinations of words such as bi-grams and tri-grams are used as features in addition to the basic words.

For each numbered feature type above, one may combine it with those of the same type in the customer's previous transactions, such as the previous four transactions (local history). For example, feature 4 (day of the week for the current transaction) may be combined with feature 4 of the previous transaction to produce a new feature. For set-valued attribute types, such as the day of the week of the current shopping trip, Boolean features may be instantiated for each value, for example, in this case, one attribute per day. The combination of these features used may be simple Boolean conjunctions. For the feature types corresponding to continuous valued attributes such as the frequency of the interval, a single real valued feature may be created. To create combinations of these features, one may use a non-linear transformation. In contrast, for the attribute types corresponding to continuous valued attributes, such as the range into which the current acquisition falls, a single real-valued attribute may be created.

Using the sub-model of the shopping list, a predicted shopping list may be generated at any point, such as before the customer enters the store or when the customer enters the store. As discussed in more detail below, the current context, such as the day, date, and/or time, may be used with the sub-model of the shopping list to generate statistical probabilities that the customer may wish to purchase any product category, such as a product class, individual products, or specific types of individual products. The statistical probabilities may then be used to output certain product categories to the customer as a predicted shopping list.

ii. Behavior Analysis Attribute of Customer Model

One attribute of the customer model is a behavior analysis attribute(s), which may be generated by the behavior analysis training module 224. The behavior analysis training module 224 may analyze the data from the training transactional database 110 and derive shopping behavior patterns of a particular customer. The shopping behavior patterns may relate to characteristics about a customer based on the product categories that customer acquires. The behavior analysis module 120 may determine characteristics, such as those relating to lifestyle and behavior, by determining a ratio of the product categories acquired by a particular customer to the product categories acquired by all other customers. Depending on the behavior and the data available this may be done on a product-by-product basis, or may be done on an aggregate set of products. Examples of product categories include LIFESTYLE_ELECTRONICS, PETS_DOGS, PETS_CATS, PETS_OTHER, FAMILY_KIDS, FAMILY_TEEN, RELIGION_JEWISH, RELIGION_MUSLIM, FOOD_ORGANIC, FOOD_NEW_AGE, etc. Products previously purchased may be placed in any one or multiple categories. Two scores may then be calculated for each customer C and each category T to define the behavior of a particular customer. The scores may be based on the amount of money spent or on the amount of items purchased. For example, the first score $C_1$ may be the money spent on products from category T by customer C divided by the total spent by customer C. The second score $C_2$ may be the average ($C_1$) for all customers who buy at least one product from category T. A Symmetric Ratio Spend Score may then be derived for customer C, category T as $C_1/C_2$ if $C_1 > C_2$, or $-C_2/C_1$. As another example, the scores may be based on the amount of items purchased in a particular category rather than on the amount of money spent on a category. In particular, $C_1$ may be the number of products bought from category T by customer C divided by the total number of products bought by customer C. These examples of customer's behaviors are merely used as examples. Other shopping behaviors may be derived using behavior analysis training module 224.

iii. Brand Loyalty Attribute of Customer Model

Another attribute of the customer model is a brand loyalty, which may be generated by the brand loyalty training module 226. Customers typically have a propensity to choose a specific brand given the availability of that brand for a product category T, as well as across product categories. The degree of brand loyalty may be subsequently used to more effectively offer promotions. As discussed in more detail below, brand loyalty may be used to determine whether it is reasonable to try to induce a brand switch or whether trying to stretch the brand to other product categories is more appropriate. Brand loyalty may also be used to offer customer packaged goods companies promotions based on brand usage.

The brand loyalty attribute(s) may comprise a brand loyalty score for every customer, product category, brand, etc. The scores may then be aggregated in any manner. For example, the brand loyalty for all Coca Cola® products (which may include Coca Cola®, Sprite®, Tab®, etc.) may be compiled. The brand loyalty scores may be created by the brand loyalty training module 224 in a variety of ways for every customer—product category pair. For example, brand loyalty may be calculated for a customer—product category as the number of brands bought by the customer in a particular product category divided by the total brands available in the particular category. Alternatively, the brand loyalty may be calculated similar to the previous example, except that the score may be modified based on the popularity of the brand (e.g., brands that are popular receive a lower score and brands that are not very popular receive a higher score). Still another brand loyalty score may derive the premium that is being paid by the customer for the brand that he or she is loyal to. If the customer is loyal to the cheapest brand, the brand loyalty score may be reduced. If the customer is loyal to the most expensive brand, the brand loyalty score may be increased.

iv. Wallet Share Attribute of Customer Model

Another attribute of the customer model is a wallet share, which may be generated by the wallet share training module 228. Customers tend to use different retailers for different categories of goods. The wallet share training module 228 may examine the broad categories for which a customer tends to use a particular retailer, and the proportion of the customer's spending that the retailer is receiving for these categories. For example, does the customer ever use a particular grocery store for bakery goods, personal hygiene, magazines, toys, electronics, etc. If the customer does the grocery store to purchase products in a broad category, to what extent. As discussed below, the wallet share attribute may be used when determining whether and/or what type of promotions to offer a customer. For example, a promotion may be offered for a product in a category not typically purchased by the customer from this retailer.

v. Price Sensitivity Attribute of Customer Model

Another attribute of the customer model is a price sensitivity, which may be generated by the price sensitivity training module 230. The price sensitivity training module 230 may measure how sensitive a specific customer is to prices by binning the customer's purchases at different levels. When the data is sparse for a specific product, one may aggregate to the product category level. In addition, comparisons may be made across different customers by calculating the percentile price the customers typically pay for a particular product. As discussed in more detail below, knowledge of price sensitivity enables one to restrict promotions to those who need the additional inducement to trigger a purchase.

There may be different levels of detail in determining price sensitivity, such as at the individual level and at the cluster level. At the individual level, price sensitivities for each customer may be derived with respect to each product. And, shrinkage-like techniques may be used to smooth these estimates. The output of the derivations may comprise a tree of price sensitivities for each customer. The estimates at the leaf nodes may be determined in the following way: given customer C, product P, calculate pairs ($R_i \in R$, $P(R_i)$) where R is the set of all unique prices for product P during all of customer C visits, and $P(R_i)$=(number of times customer C visited the store and bought product P at price R)/(number of times customer C visited the store and price of product P was R).

Given pairs ($R_i$, $P(R_i)$), a least squares fit may be performed to obtain a linear equation relating $P_i$ and $P(R_i)$. The slope of that line may be the price sensitivity and the $R_2$ is the confidence. These individual price sensitivities may be aggregated and used to calculate price sensitivities at sub-category and category levels.

At the cluster level, ($R_i$, $P(R_i)$) may define a probability distribution for each customer and product. By clustering customers that have similar price sensitivities for one or more products, one can group them together to create more robust statistics. $R_{cpi}$ is the ith price for product P and customer C.

vi. Promotion Sensitivity Attribute of Customer Model

Another attribute of the customer model is a promotion sensitivity, which may be generated by the promotion sensitivity training module 232. The promotion sensitivity training module 232 may provide a measure of a customer's response to a promotion, such as a sale, or coupon offering. The promotion sensitivity training module 232 may determine various aspects of promotion sensitivity, such as hoarding and price efficiency.

The promotion sensitivity training module 232 may assess an individual customer's responses to promotions on a product by product basis. There are various measures of a customer's response to promotions including: (1) hoarding; (2) price efficiency; (3) opportunistic index; (4) coupon index; and (5) sales ratio. These measures are merely for illustrative purposes, and other measures of a customer's response to promotions are available.

With regard to hoarding, the promotion sensitivity training module 232 may determine whether a customer hoards product categories during a sale, and if the customer hoards, whether the hoarding is of a type that is to be encouraged. Hoarding, or acquiring a greater number of a particular product category during a sale, is a common customer behavior. In some cases, a customer will purchase more of a particular product category during a sale than they would normally, but fewer after the sale. However, if the total amount spent on the particular product category during the sale and after the sale is greater than it would have been over the same time period if the sale had not occurred, the customer is considered a "good hoarding." However, if the total amount spent on the particular product category during the sale and after the sale is less than it would have been over the same time period if the sale had not occurred, the customer is considered a "bad hoarder." The promotion sensitivity training module 232 treats a "neutral hoarder," which includes customers that do not change their acquisition behavior as a result of a sale, as a subcategory of bad hoarders because such customers benefit from the sale even though they are not sensitive to it.

To determine whether a customer is a "good hoarder" or a "bad hoarder," with respect to a particular product category, the promotion sensitivity training module 232 may examine a customer's acquisition behavior with respect to a particular product category during three time periods: pre-sale, sale, and post-sale. Generally, it can be assumed that the duration of the sale period is the same for all customers. However, the pre-sale and post-sale periods may differ among the customers because it is based on the individual replenishment rates of each customer for that particular product category. Therefore, if a customer acquires a product category less often, the replenishment rate is lower, and thus the pre and post sale periods are made longer. The pre and post sale periods may or may not be equal in duration.

The promotion sensitivity training module 232 may determine whether a customer is a good or bad hoarder by examining transaction data over a predetermined time period, such as three (3) months, or a predetermined number of replenishment cycles, such as 6. If a new sale occurs during the post or pre sale period, the promotion sensitivity training module 232 may shorten the post or pre sale period, respectively, accordingly.

One way to identify bad hoarders is to compare the total revenue for the sale and the post sale period with that of the pre sale period. This method is useful for identifying total revenue lost. Alternatively, one may ignore the sale subject to the promotion, and merely focus on customers that spend less after the sale then they did before as a measure to identify bad hoarders. The latter method, while less conservative, gives a measure of whether customers increased their consumption of a product or did they simply store it at home for a rainy day. If loading up as opposed to increased consumption occurred, the post sale period can be further divided into the reserve period and the resumed consumption period. Those periods may be identified by comparing replenishment rates with the rule-based replenishment rate.

As discussed subsequently, determining hoarding behavior is beneficial in determining whether to provide a promotion and/or the type of promotion. By identifying bad hoarders as those who spend less during the sum of the sale period and the post period than they did during the pre sale period, one may calculate the amount of revenue lost for the store, and determine whether this detriment outweighs the benefits of providing the promotion. One may also predict future behavior of customers by looking at the previous sales data and advise the store management which customers should be receiving promotions.

The promotion sensitivity training module 232 may provide a measure of promotion sensitivity in terms of a sensitivity index, and/or one or more price efficiency indices. The sensitivity index represents the percentage of change in the quantity of a particular product category acquired during a sale over or under that acquired when there is no sale. The promotion sensitivity training module 232 may determine the sensitivity index for individual customers as well as individual products and product categories.

With regard to price efficiency, the promotion sensitivity training module 232 may also provide a comparison of the sale behavior of an individual customer to that of other customers (the "price efficiency indices"). The price efficiency indices may include an opportunistic index and/or a coupon index. These indices may provide a measure of how savvy a customer is by examining how much that customer actually pays for particular product categories.

The opportunistic index may measure the average difference between the price the customer paid and the most common price of a product category. The common price of a product category may be determined over any time period, such as the most frequently occurring daily price over the last 2 years. The opportunistic index includes the effects of promotions and permanent price changes. From the point of view of the customer, a negative opportunistic index is good. For example, a customer who shops more often during sales will have a highly negative opportunistic index. However, the customer will get points for getting a lower price than the mode even if the product is not on sale. This will include permanent price drops, coupons, etc.

The coupon index may measure the difference between the price the customer paid and the price paid by most people the day of the purchase (mode of the day). This provides a measure of how much of an individual price a customer receives. More than just a measure of sales, this provides a measure of whether the customer prefers to beat the price that others are paying that day. As discussed subsequently, this measure may be useful for analyzing individual promotions such as coupons (unless they are very popular coupons that most people use during a day). From the point of view of the customer, a negative value is typically good.

The promotion sensitivity training module 232 may also determine a sales ratio. The sales ratio is the ratio of the number of items in a product category acquired during a sale to total the number of products purchased. It is useful for analyzing the effects of advertised sales. A positive sales ratio indicates an effective sale.

vii. Product Substitution Attribute of Customer Model

Another attribute of the customer model is a product substitution, which may be generated by the product substitution training module 234. The product substitution training module 234 may identify a product or products that are substitutes for one or more products on a shopping list. Alternately, or in addition, the product substitution training module 234 may identify product categories on the shopping list that are substitutes for each other. As discussed below, this information may be used at runtime, wherein the shopping list runtime module may remove one or more of the substitute product categories from the shopping list.

The product substitution module 324 may determine product category substitutions at multiple levels, such as store-level substitutes and customer-level substitutes. For the same product category, the substitutes may not be the same at the store and customer levels. For example, Coke® and Diet Coke® may be substitutes for one another at the store level, but for a particular customer, Coke® and Diet Coke® may not be substitutes.

The product category substitution module 324 may determine substitutes according to the following:

For items i and j, Calculate P(i), the probability of buying item i, P(j), the probability of buying item j, and P(i, j), the probability of buying both items i and j.

C(i, j)=0 if i and j are in different categories, and 1 if they are in the same category. If P(i, j)<P(i)*P(j) and C(i, j)=1, then i and j may be considered substitutes. Therefore, substitutes may be determined using a score for each item pair, i and j, that measures the degree to which they can be substituted for each other. This score can be calculated in a variety of ways. As discussed above, the score is 0 if the items i and j are not in the same category and equals P(i, j)/(P(i)*P(j)) if the items are in the same category. If i and j are in the same category and always bought together, then the items are not substitutes. If the items are in the same category and are rarely (or never bought together), then they may receive a high substitution score.

viii. Basket Variability Attribute of Customer Model

Another attribute of the customer model is a basket variability, which may be generated by the basket variability training module 236. Basket variability measures the variance of a particular customer's total spending from one shopping visit to the next. In other words, basket variability is an indicator of how much a given customer's total spending during a visit tends to vary from visit to visit. If the customer has a high variability (i.e., the variance is significantly greater than average so that the customer does not have a set amount of spending from one visit to the next), one may offer promotions intended to grow basket size. The basket variability may be determined in a variety of ways. For example, basket variability may be determined as the distance of the customer's basket distribution from a uniform distribution using a mean-squared error distance or Kulback-Liebler divergence. In particular, the basket variability training module 236 may determine for different values of X and Y, the percentage of times, X % of their shopping baskets (in terms of total spent) were within Y dollars of each other. Any values of X and Y may be selected.

As discussed in more detail below, a promotion may be offered to grow the basket size (e.g., 3 for the price of 2, etc.) if the customer's basket size varies. If the customer has a low variability (i.e., the variance is significantly lower than average so that the customer spends a set amount from one visit to the next), one may offer promotions intended to maximize margin. As discussed in more detail below, a customer may be offered a promotion for a product which is a higher margin for the retail establishment (e.g., 10% off a high margin brand).

ix. Shopping Trip Frequency Attribute of Customer Model

Another attribute of the customer model is a shopping trip frequency, which may be generated by the shopping trip frequency training module 238. Shopping trip frequency relates to the frequency or timing of shopping trips. For example, the data relating to timing of previous shopping purchases in the training transactional database 110 may be analyzed to derive an attribute relating to the frequency of shopping trips. Specifically, the dates of the last "x" number of shopping trips may be analyzed to determine an average time between the shopping trips, a particular shopping day of the week (such as Sunday) and/or the particular shopping time of the day (such as in the morning). As discussed subsequently, these shopping trip frequency attributes may be used to determine whether and what type of promotions should be offered to a particular customer.

B. Runtime System Using Customer Model

As discussed above, the customer models may be used to improve any aspect of a retail establishment's operations. The customer models may be generated, and when needed, accessed at any time using a runtime system. In the context of a grocery store, the customer model may be accessed before, during, and after a customer shops at the grocery store. Moreover, one, some, or all of attributes of the customer model may be accessed during runtime. For example, the shopping list sub-model of the customer-model may be accessed when the customer arrives at the grocery store, generating a predicted list of items for the customer. This predicted list may then be used by other attributes of the customer model in order to offer promotions to the customer. Alternatively, only a predicted shopping list may be generated without any promotions related to any of the predicted items on the list. Or, promotions may be generated for items not related to a predicted shopping list.

Figure 3:
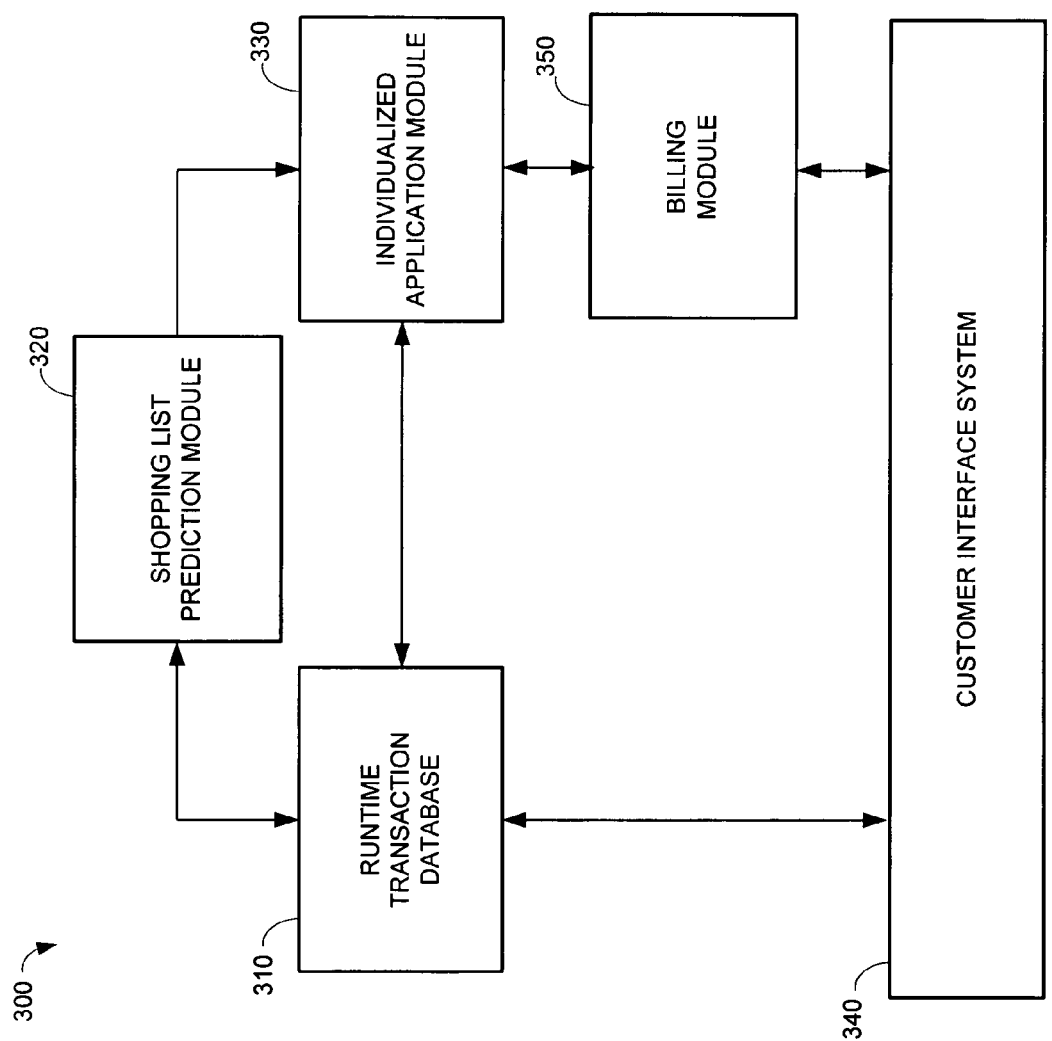
FIG. 3 is a block diagram of an individualized customer interaction system.

FIG. 3 is a block diagram of one example of a runtime system 300 using the customer models wherein a shopping list is predicted (using shopping list prediction runtime module 320) and wherein promotions are provided related to items on the predicted shopping list (using individualized application runtime module 330). The runtime system 300 may further include a customer interface system 340. The runtime system 300 may use a runtime transactional database 310 and the customer models database 140, shown in FIG. 1. The runtime transactional database 310 may be similar to the data included in the training transactional database 110, but may be updated with additional data, such as the current context.

The shopping list prediction runtime module 320 may access a specific customer model in the customer models database 140. Each customer model may be used to predict a shopping list for a given customer on a given shopping trip ("transaction") and to provide other individualized applications to the customer. As discussed above, the runtime system 300 is applicable in a variety of circumstances in which customers seek to acquire goods and/or services (collectively or individually a "product" or "products").

Similar to the training system 100, any or all of the runtime system 300, including the runtime transactional database 310, shopping list prediction runtime module 320, individualized application runtime module 330, may be implemented on one or more computers. The computer may include one or more processors. The processor may include any type of device or devices used to process digital information. The runtime transactional database 310, shopping list prediction runtime module 320, individualized application runtime module 330, and/or portions of the foregoing may also include one or more computer-readable media, as described below.

Within the computer system, shopping list prediction runtime module 320 and individualized application runtime module 330 may be implemented in a computer-readable medium, or an electromagnetic signal that carries logic that defines computer-executable instructions for performing the functions of the shopping list prediction module 110 and the individualized application module 130.

Using the customer model, the shopping list prediction runtime module 320 generally predicts a list of product categories (which may include goods and/or services) that a customer will want or need to acquire on a given shopping trip (a "shopping list"). The product categories may include a grouping of one or more product classes, individual products, or specific types of individual products (include goods and/or services). The shopping list prediction runtime module 320 may frame the process of predicting a shopping list as a classification. Generally speaking, classifications may be determined by constructing a procedure (a "classification rule") to apply to a continuing sequence of cases, in which each new case is assigned to one of a set of pre-defined groups. By framing the shopping list prediction issue in this manner, the issue becomes the construction of a classification rule that, when applied to a particular customer on a particular shopping trip ("transaction"), assigns a particular product category to one of two, potentially binary, groups. The first group includes product categories that are to be acquired by that customer (the "acquire group"), and the second group includes product categories that are not to be acquired by that customer (the "do not acquire group").

As discussed above, a classification rule may be implemented for a particular customer by assigning a classifier to each product category that a particular customer may acquire. Thus, a classifier may be included for each product category for each customer with sufficient data. At runtime, the current context, such as the day, date, and time, may be input to the classifier. The classifier may output a probability that the customer will purchase the product category in this shopping trip. Depending on the probability, the product category may be in the acquire group or the do not acquire group. If the classification is repeated for each product category a particular customer is likely to obtain, a shopping list may be constructed from the product categories in the acquire group.

Figure 4:
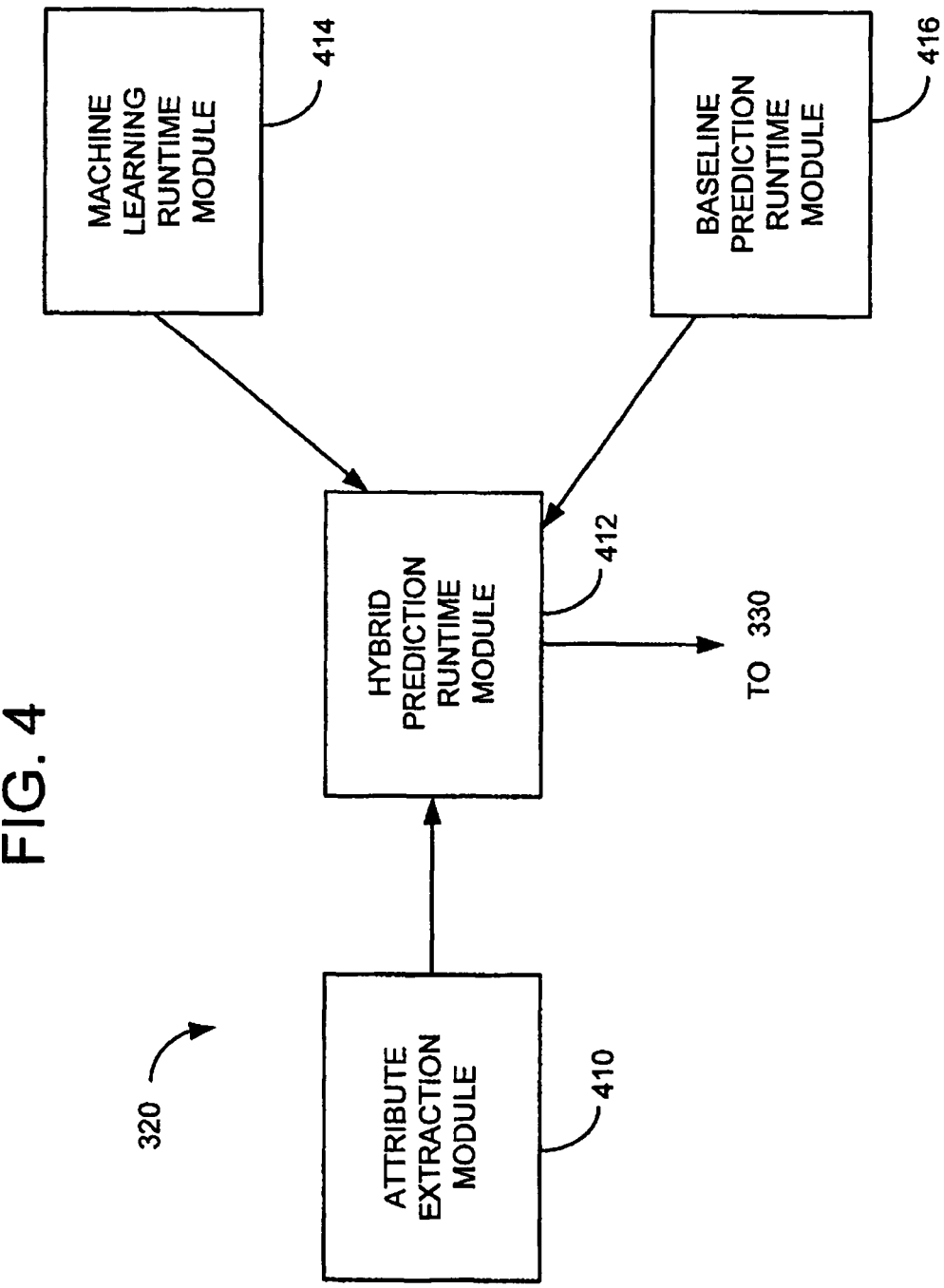
FIG. 4 is a block diagram of a shopping list prediction runtime module depicted in FIG. 3.

FIG. 4 shows an expanded block diagram of the shopping list prediction runtime module 320. As discussed above, the shopping list training module 232 may use a plurality of methodologies in which to generate the attributes of a shopping list in the customer model. Examples of the various methodologies include rule-based prediction and machine learning. At runtime, the attributes from the various methodologies may be accessed, using the attribute extraction module 410, and updated based on the runtime current context to generate a shopping list based on the methodology. For example, accessing the customer model using a sub-model generated by a machine learning method, the machine learning runtime module 414 may update the sub-model for the runtime context, including: the replenishment interval at $t^j$; the frequency of interval at $t^j$; the range into which the current acquisition falls; the day of the week of the current shopping trip; the time of the day for the current transaction; and the quarter of the year for the current transaction. The machine learning runtime module 414 may then generate a predicted shopping list for each product category (such as all of the individual products offered by the store). Similarly, accessing the customer model using a sub-model generated by a rule-based prediction method, the rule-based prediction runtime module 416 may update the sub-model for the runtime context, and generate a predicted shopping list for each product category.

The hybrid prediction runtime module 412 may provide a hybrid approach, between machine learning and rule-based methods, to generating a shopping list. The hybrid prediction runtime module 412 may select one of the prediction methods or a combination of the prediction methods in order to formulate a probability that a particular product category may be purchased by the customer on this shopping trip. The hybrid prediction runtime module 412 may treat each class as independent of each other for a given transaction. Therefore, the hybrid prediction runtime module 412 may uses different classification methods for different classes. For example, the hybrid prediction runtime module 412 may combine a top-n rule-based classifier created by the rule-based prediction runtime module 416 with various classifiers created by the machine learning runtime module 414, where if the rule-based prediction module 212 (for example, using the top-n predictor (for given n)) is positive for a given class, the hybrid prediction runtime module 412 will predict that the product category included in the class will need to be acquired, otherwise the hybrid prediction runtime module 412 will predict according to the output of the machine learning runtime module 414. Thus, the hybrid prediction runtime module 412 may determine a probability, based on a single or multiple prediction approaches, for one, some, or all of the product categories.

After the probabilities that the product categories may be purchased on this shopping trip, the hybrid prediction runtime module 412 may analyze the probabilities in order to compile a predicted shopping list. The analysis may comprise a pre-determined probability score, below which the product category is not included on the shopping list. For example, if the pre-determined probability score is 0.7 (from a scale of 0 to 1.0), all product categories with a probability of purchase on this shopping trip with 0.7 or above are included on the shopping list. Alternatively, the pre-determined probability score may be specific to each product category. For example, yogurt purchases may have a pre-determined probability score of 0.8 whereas milk purchases may have a pre-determined probability score of 0.9. Moreover, if after the predicted list is compiled, the amount of items on the list may dictate readjustment of the pre-determined probability score(s). For example, if the predicted shopping list results in only 2 items on the list, the pre-determined probability score(s) may be lowered so that more items may be placed on the list. Conversely, if the predicted shopping list results in over 50 items on the list, the pre-determined probability score(s) may be raised so that fewer items may be placed on the list.

Once the predicted shopping list is generated, the list may be sent to the individualized application runtime module 330. The individualized application runtime module 330 includes one or more applications that provide individualized interactions with a particular customer that are customized for that particular customer ("individualized applications").

The individualized application runtime module 330 may receive input from any module which provides an item or items of potential interest to a customer. As discussed above, the shopping list prediction runtime module 320 is one example of a module which may provide an item or a list of items. Other modules may likewise provide an item as input to the individualized application runtime module 330. For example, a module which senses the location of the customer in the store, such as in the dairy aisle, may input any dairy type of product to the individualized application runtime module 330.

Figure 5:
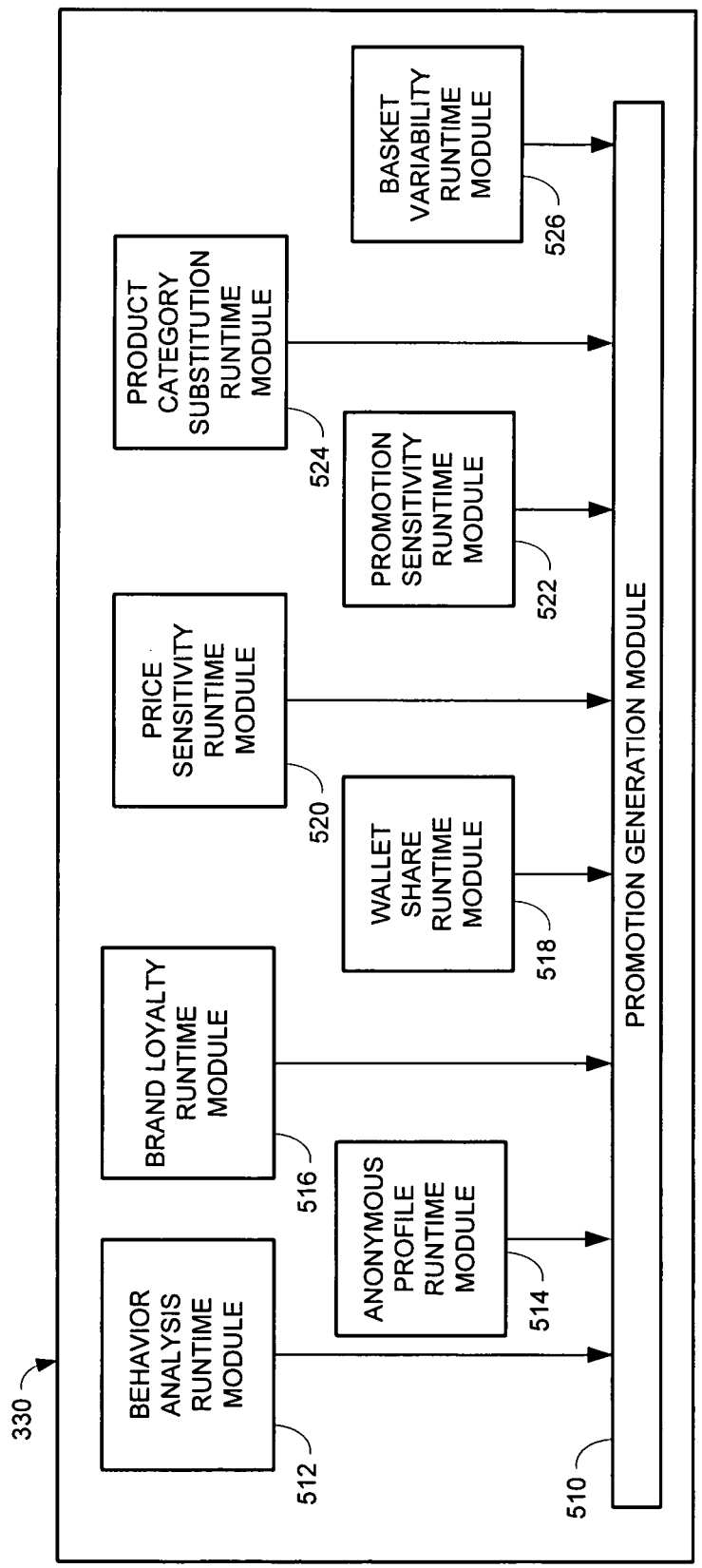
FIG. 5 is a block diagram of an individualized customer interaction module depicted in FIG. 3.

An example of the individualized application runtime module 330 is shown in FIG. 5. The individualized application runtime module 330 may include a promotion generation module 510 and one or more other modules 512, 514, 516, 518, 520, 522, 524, 526 that may access a part of the customer profile and, based on the goals of the retail establishment, provide input to the promotion-module. The promotions may be provided at any point, such as when the customer enters the store, in the midst of shopping in the store, or at checkout.

Various goals of the retail establishment may be implemented using modules 512, 514, 516, 518, 520, 522, 524, 526, as discussed below. The goals may include increasing sales, increasing profit, providing information, providing a promotion for a third party, etc. For example, the behavior analysis runtime module 512 accesses the behavior analysis attribute of the customer model. As discussed above, the behavior analysis attribute reflects shopping behavior patterns of a particular customer. The behavior analysis runtime module 512 may offer promotions consistent with the shopping behavior patterns of the customer. Depending on the behavior and the data available, the promotions may be performed on a product-by-product basis, or may be done on an aggregate set of products. For example, if the behavior analysis attribute of a particular customer reflects an emphasis on purchasing organic foods, promotions may be tailored to highlight various organic foods in the grocery store. In particular, the organic food in the grocery store is often dispersed throughout the store. A customer may be alerted to organic food he or she may otherwise be unaware of when the shopper travels down the aisles of the grocery store. As another example, if the behavior analysis attribute of a particular customer reflects an emphasis on purchasing Dove® soap, a customer may be notified when related items, such as Dove® bodywash is introduced or is on sale.

As another example, the brand loyalty runtime module 516 may access the brand loyalty attribute of the customer model. As discussed above, the degree of brand loyalty may be used to more effectively offer promotions. Knowledge of the degree of a customer's tendency to buy one brand of a product over others in a product category, as well as the degree of the tendency to buy a given brand when available in any product category enables the selection of specific promotion tactics by the brand loyalty runtime module 516. For example, for very high brand loyalty, it may be appropriate to do "brand extensions"—to introduce new products of the same brand. For medium brand loyalty, it may be appropriate to attempt to either raise loyalty with discounts on the existing brand, or to attempt to switch the customer to a new brand. For low levels of loyalty, it may be appropriate for promotions intended to achieve short term revenue gains.

For example, if a particular customer exhibits a low degree of loyalty for purchases of yogurt (e.g., the customer does not have a favorite brand of yogurt), the brand loyalty runtime module 516 may craft a promotion to induce the consumer to try a specific brand of yogurt if given a promotion. Alternatively, if a customer exhibits a high degree of loyalty for a certain brand, such as Tostitos® chips, it may be possible to extend the brand to other product categories, such as Tostitos® salsa. Brand loyalty may also be used to offer customer packaged goods companies promotions based on brand usage.

The wallet share runtime module 518 may access the brand loyalty attribute of the customer model. Typically, grocery stores offer more than packaged food items; instead, larger grocery stores offer other items such as bakery goods, personal hygiene, magazines, toys, electronics, etc. The wallet share attribute may indicate the broad categories for which a customer tends to use a particular retailer, and the proportion of the customer's spending that the retailer is receiving for these categories, as discussed above. Knowledge of a particular's customer's spending enables the grocery store to target promotions for categories where the particular customer is not purchasing (or purchasing less in proportion to other categories). For example, if a particular customer typically does not purchase magazines from a grocery store, the wallet share runtime module 518 may provide a promotion to purchase a magazine. Further, the timing in which the promotion is given to the customer may depend on the customer's location in the store. For example, if the magazines are located near the checkout line, the customer may receive a promotion when waiting to checkout, as discussed in more detail below.

The price sensitivity runtime module 520 may access the price sensitivity attribute of the customer model. The price sensitivity attribute may measure how sensitive a specific customer is to prices, as discussed above. Using the price sensitivity attribute, the price sensitivity runtime module 520 may determine whether to offer a promotion to a customer, if a promotion is offer, the parameters of the promotion to offer the customer. If a customer is price sensitive for a product, such as milk, the price sensitivity runtime module 520 may determine that a promotion may be a sufficient incentive to try a new or a different brand of milk. Moreover, if a variety of promotions may be offered to the customer (e.g., 10%, 20%, 30% off; or 2 for 1, 3 for 2, etc.), the price sensitivity runtime module 520 may provide the amount of discount for the promotion given the past history of the customer and the price sensitivity of the customer, as indicated by the price sensitivity attribute.

Figure 6:
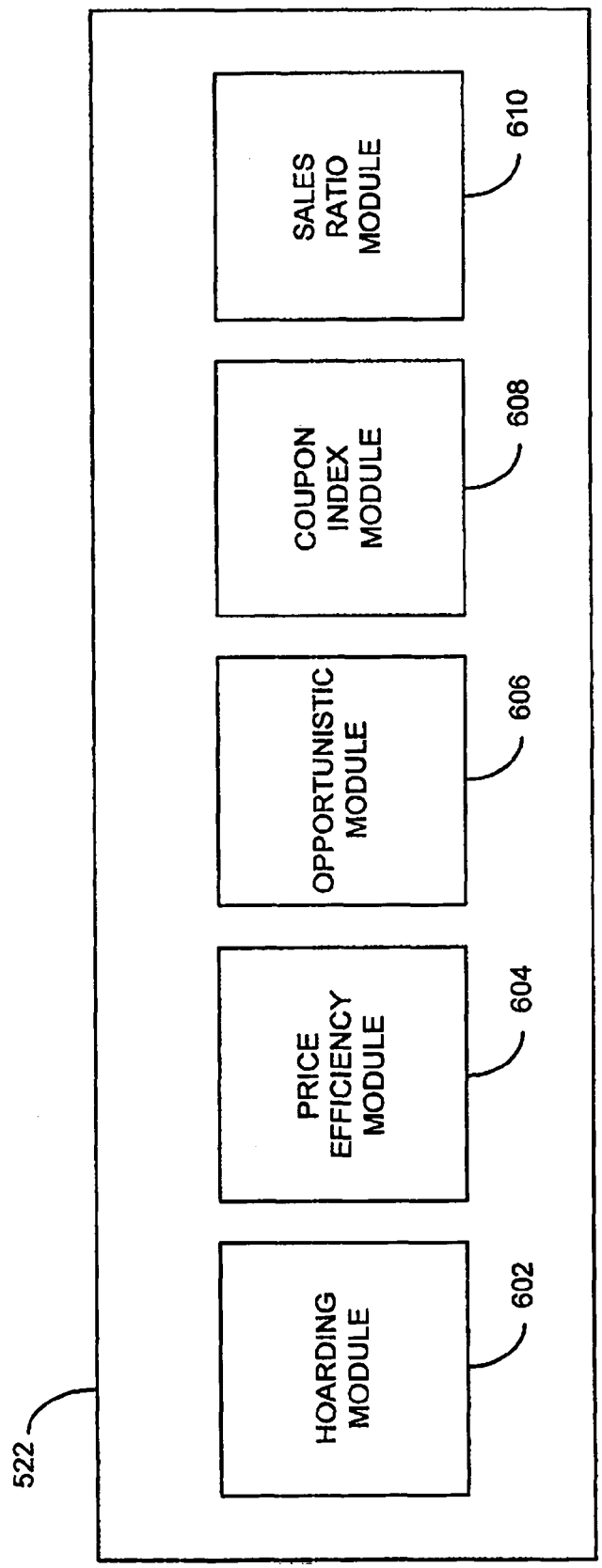
FIG. 6 is a block diagram of a promotion sensitivity runtime module depicted in FIG. 5.

The promotion sensitivity runtime module 522 may access the promotion sensitivity attribute of the customer model to determine whether, and/or what type of promotion to offer a particular customer. Referring to FIG. 6, there is shown an expanded block diagram of the promotion sensitivity runtime module 522. As discussed above, there are various measures of a customer's response to promotions including: (1) hoarding; (2) price efficiency; (3) opportunistic index; (4) coupon index; and (5) sales ratio. The promotion sensitivity runtime module 522 may include a hoarding module 602, a price efficiency module 604, an opportunistic index module 606, a coupon index module 608 and a sales ratio module 610.

As discussed above, the hoarding attribute may provide a measure of whether a shopper is a "good hoarder" or a "bad hoarder." Based on this information, the hoarding module 602 may determine whether to provide a promotion to a particular customer, and if so, what type of promotion. The ability to note the degree to which a particular customer "pantry loads" or "hoards" a particular product allows the hoarding module 602 to determine whether they are an appropriate candidate to receive a promotion intended to boost overall consumption of the product, withhold any promotion, or provide a promotion to generate short term revenues.

For example, if the customer is a bad hoarder, the hoarding module 602 may determine not to provide a promotion to the customer. Or, given that the customer has previously exhibited bad hoarding characteristics, the hoarding module 602 may attempt to provide different types of promotions in an attempt to elicit different behavior from the customer. For example, if the customer has previously hoarded for promotions relating to discounts such as a percentage reduction or a fixed amount off (such as 10% or $0.50 off of spaghetti), the hoarding module 602 may determine that a different type of promotion (such as 10% or $0.50 off of spaghetti and sauce in combination), is warranted. If the customer is a good hoarder, the hoarding module 602 may determine to provide a promotion to the customer, and the type of promotion based on the customer's reaction to previous promotions.

The price efficiency attribute may provide a measure of whether a shopper is an indicator of the sale behavior of a customer relative to other customers. In particular, is this customer a "savvy" shopper with regard to how much paid for various items. Based on this information, the price efficiency module 604 may determine whether to provide a promotion to a particular customer, and if so, what type of promotion. The amount of discount for an item may be increased for a customer with a higher price efficiency index than another customer with a lower price efficiency index.

The opportunistic index attribute may provide a measure of the frequency in which the customer purchases items on sale. Based on this information, the opportunistic index module 606 may determine whether to provide a promotion to a particular customer, and if so, what type of promotion. The opportunistic index may be applied for various product in the store, with some products having a negative opportunistic index (typically purchased on sale) and other products having a positive opportunistic index (typically not purchased on sale). For those products with a negative opportunistic index, the opportunistic index module 606 may craft a promotion with a reduction in price. Similarly, for those products with a positive opportunistic index, the opportunistic index module 606 may craft a promotion with an advertisement detailing the benefits of the product without a reduction in price.

The coupon index attribute may provide a measure of how much an individual price a customer receives. Based on this information, the coupon index module 608 may determine whether to provide a promotion to a particular customer, and if so, what type of promotion. For example, a customer with a negative coupon index indicates that the customer may respond well to individualized promotions. Therefore, the coupon index module 608 may craft several promotions for the items listed in the customer's shopping list.

The sales ratio attribute may provide a measure of the number of products bought during sales to the total number of products. Based on this information, the sales ratio module 610 may determine whether to provide a promotion to a particular customer, and if so, what type of promotion. If a customer has a low sales ratio attribute, this indicates that the customer may be averse to being provided many promotions. Therefore, the sales ratio module 610 may determine that fewer promotions for percentage reductions on items should be provided to the customer, and other promotions, such as advertisements or suggestions for recipes, etc. may be more beneficial. Conversely, if a customer has a higher sales ratio attribute, the sales ratio module 610 may determine that a greater number of promotions for percentage reductions is warranted.

The product category substitution runtime module 524 may access the product category substitution attribute of the customer model to determine whether, and/or what type of promotion to offer a particular customer. The product category substitution attribute may identify a product category (such as an individual product) that may be substituted for one or more product categories (such as one or more products) on a shopping list. Given a shopping list, the product category substitution runtime module 524 may review the list for any potential substitutions in product categories. If items are in the same category and are rarely (or never bought together), then one item may be recommended for substitution of another item. For example, one product on the predicted shopping list may comprise Dannon® strawberry yogurt. A potential substitute product may comprise the store-brand strawberry yogurt.

The basket variability runtime module 526 may access the basket variability attribute of the customer model to determine whether, and/or what type of promotion to offer a particular customer. The basket variability attribute is an indicator of how much a given customer's total spending during a visit tends to vary from visit to visit. Awareness of a customer's basket variance can be used to choose between margin maximization tactics (e.g. discount on high margin products) or revenue maximization tactics (e.g. discounts on larger pack sizes). In particular, using the basket variance, the basket variability runtime module 526 may offer promotions designed to grow basket size (such as, 3 products for the price of 4), or promotions designed to maximize margin (such as 10% off a high margin brand). For example, if the customer has a high variability (i.e., the variance is significantly greater than average so that the customer does not have a set amount of spending from one-visit to the next), the basket variability runtime module 526 may offer promotions intended to grow basket size. For example, the basket variability runtime module 526 may determine that a "buy 2 get 20% off" promotion is more appropriate than a "buy 1 get 10% off" since the customer does not have a fixed basket size. Alternatively, if the customer has a low variability, the basket size may be more constant. The basket variability runtime module 526 may then attempt to move the fixed basket customer to a higher margin product, such as offering a promotion to purchase a store brand.

The individualized application runtime module 330 may also include an anonymous profiling runtime module 514. When a customer, for privacy or other reasons, chooses not to be identified, the individualized application module 300 may provide the anonymous customer a limited level of individualized interaction. The anonymous profile runtime module 514 may use the current transactional data to create an incremental profile, and provide some information to the anonymous customer. For example, the anonymous profile runtime module 514 may use the product categories acquired during a transaction. The anonymous profile runtime module 514 may receive such information from a product identification system, such as a scanner, to identify products selected by the anonymous customer in the course of the anonymous customer's current transaction. As the customer shops a profile is built, on the fly, as each additional item is scanned. As the profile grows it can be matched to existing, more detailed profiles from which detailed predictions can be made. While this will be less accurate than relying on profiles built over time from known customers, it is enough to provide some of the same benefits.

The promotion generation module 510 may be in communication with any one of the modules 512, 514, 516, 518, 520, 522, 524, 526 to receive promotions. For example, the promotion generation module 310 may compare the percentile price that a customer typically pays for a particular product to that paid by other customers to restrict promotions to only those customers who need an additional inducement to trigger an acquisition. Further, if a single promotion is offered for an item, the promotion generation module 510 may provide the promotion to the customer interface system 340. If multiple promotions are offered for an item, the promotion generation module 510 may reconcile between the two potential promotions, such as selecting one of the promotions, or portions of both promotions, and provide it to the customer interface system 340.

The customer interface system 340 may include systems for identifying and communicating with one or more customers. For example, the customer interface system 340 may, separately or in any combination, include an input device and an output device. The output device may be any type of visual, manual, audio, electronic or electromagnetic device capable of communicating information from a processor or memory to a person or other processor or memory. Examples of output devices include, but are not limited to, monitors, speakers, liquid crystal displays, networks, buses, and interfaces. The input device may be any type of visual, manual, mechanical, audio, electronic, or electromagnetic device capable of communicating information from a person, or memory to a processor or memory. Examples of input devices include keyboards, microphones, voice recognition systems, trackballs, mice, networks, buses, and interfaces. Alternatively, the input and output devices may be included in a single device such as a touch screen, computer, processor or memory coupled with the processor via a network. For example, the input and output devices may include an infrared transmitter and receiver for communicating with a customer's portable computer or personal digital assistant ("PDA").

The input device, whether alone or combined with the output device may allow a customer to communicate identifying information to the System 300. For example, the customer may enter an identification a password or customer number that uniquely identifies the customer into the System via a keyboard or touch-screen. The customer interface system 340 may additionally or alternatively include a card reader or other such device that can obtain a customers identifying information from a credit card, bank card, frequent shopper card, loyalty card, or any other such card containing information that uniquely identifies the customer. Alternatively, biometric devices can be used, including, but not limited to fingerprint readers, voice recognition, face recognition, and signature recognition. In addition, the input device, whether alone or combined with the output device may include a device or system for gathering customer transaction data. For example, the input device may include one or more barcode scanning systems to identify and track consumer acquisitions at checkout or while the customer is shopping.

Further, promotions offered to the customers or promotions accepted by customers (such as the customers purchasing the product or service) may be subject to billing. As discussed in more detail below, the promotion given to the customer may be part of a larger promotion plan. Billing for the promotion, either in terms of billing for an impression of the promotion or for acceptance of the promotion, may be performed by a billing module 350. If billing is based on an impression of the promotion, the billing module 350 may record billing information when the individualized application module 330 sends a promotion to the customer interface system 340. The billing information may be used to calculate a fee for the service of providing the promotion. Alternatively, if billing is based on acceptance of the promotion, the billing information may be recorded after comparison, for a specific shopping trip, of the promotions offered the customer and the transactions made by the customer to determine if the customer accepted the promotion. Moreover, the fee may be constant for every impression or acceptance of the promotion. Alternatively, the fee may depend on the customer model for the customer receiving the impression or accepting the promotion or may depend on the goals of the promotion. For example, the fee may depend on ratings of certain attributes in the customer's model, such as the brand loyalty attribute. A higher fee may be charged for an acceptance of a promotion for a customer with a higher brand loyalty attribute rating and a lower fee may be charged for an acceptance of a promotion for a customer with a lower brand loyalty attribute rating. As another example, a promotion may have defined goals, such as brand switching, brand extensions, etc. The fee may be based on the outcome, such as one fee for a brand switch or another fee for a brand extension. The fee may then be billed to the party whose product is the subject of the promotion.

An individualized customer interaction system, such as that shown in FIG. 3, may be adapted for a variety of circumstances. For example, such an individualized customer interaction system may be implemented in a retail store, such as a grocery store, to provide customers with a shopping list and individualized promotions.

Figure 7:
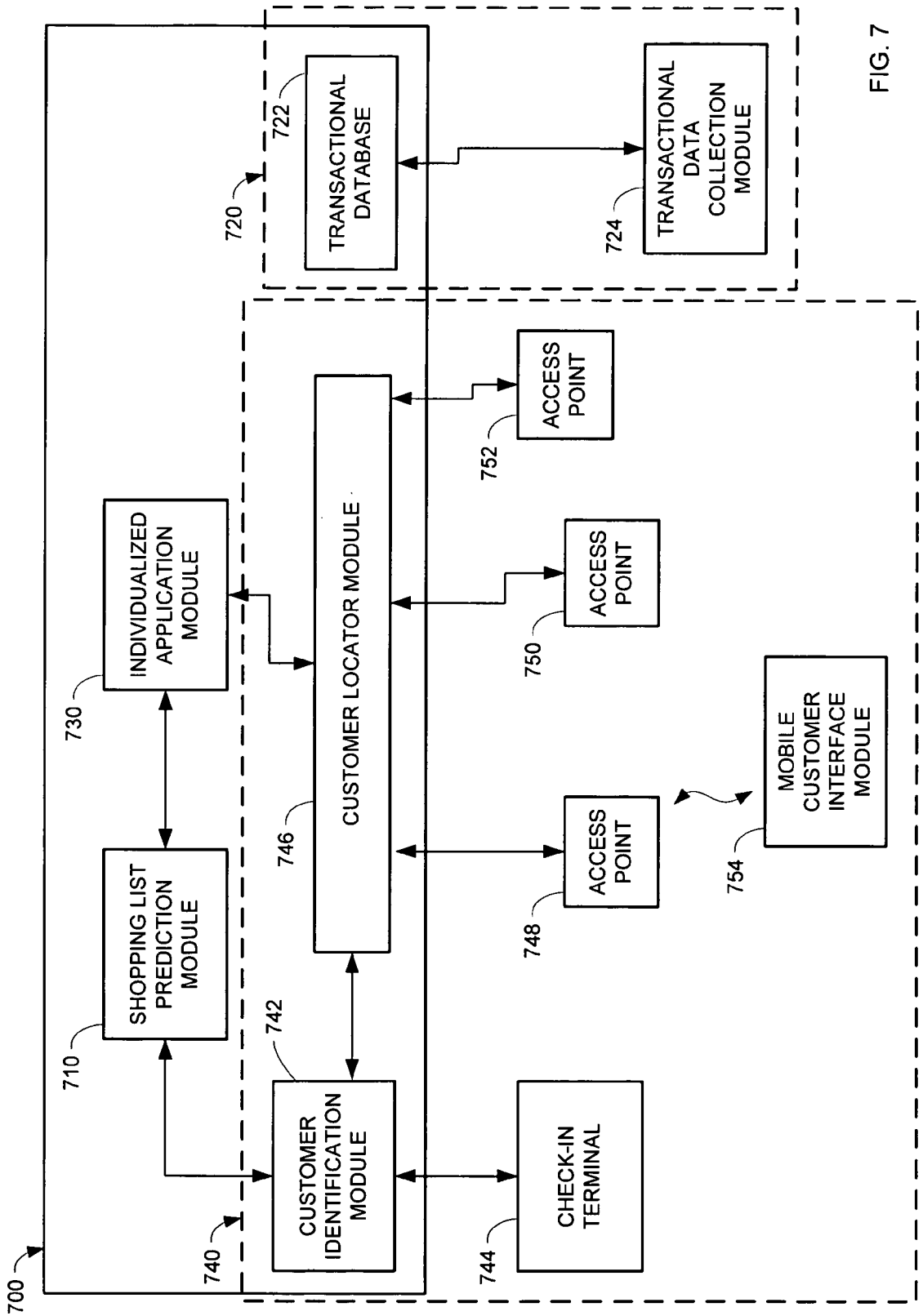
FIG. 7 is a block diagram of an individualized customer interaction system for a grocery store.

An example of an individualized customer interaction system for a grocery store is shown in FIG. 7. The Grocery System 700 may be implemented in a location used to sell groceries, such as a grocery store, and provides individualized interaction with a customer for the duration of their visit to such location. The term "grocery store" will be used in this document to refer to any location used to sell groceries, including, but not limited to a market, store, mall or other such location, whether in or out of doors. The Grocery System 700 generally includes a shopping list prediction module 710, transactional data system 720, individualized application module 730, and customer interaction system 740. These modules include all the components and features, in any combination, as described in connection with the individualized customer interaction system (see FIG. 3), except as otherwise indicated.

The customer interface module 740 enables communication with a customer throughout the duration of a transaction. The customer interface module 740 may include a check-in terminal 744 and a customer identification module 742 for identifying the customer, and one or more access points 748, 750, 752, a customer locator module 746 and a mobile customer interface module 754 that keeps track of a customer's location within the grocery store.

The check-in terminal 744 may be in communication with the customer identification module 742. Alternatively, the check-in terminal 744 and the customer identification module 742 may be included in a single device. The check-in terminal may include an interface storage space for storing one or more mobile customer interfaces 754, and one or more input and/or output devices as previously described. A customer may provide identifying information to the Grocery System 700 using the input and/or output device. This identifying information may then be communicated to the customer identification module 742, which may compare the information with information stored in a database (such as the runtime transactional database 722) to identify the customer. If the customer identification module 742 successfully identifies the customer, the check-in terminal may allow the customer to check-out a mobile customer interface module 754.

The mobile customer interface module 754 may include a PDA, touch-screen or other such device that provides communication between the customer and the Grocery System 700. The mobile customer interface module 754 may be of a size that is convenient for the customer to carry or be easily attached to a shopping cart, dolly, or other such device. In addition, the mobile customer interface module 754 may include a wireless communication system for wirelessly communicating with the Grocery System 700 via one or more access points located throughout the grocery store. This wireless communication system may include an antenna and a modem or router for communicating via a wireless protocol such as IEEE 802.11.

One or more access points 748, 750, 752 may be located at various locations in the grocery store. The access points 748, 750, 752 may generally include a communication system that is compatible and complimentary to that of the mobile customer interface module 754. The communication range of each of the access points is limited so that there is limited overlap of the communication ranges of adjacent access points. However, the access points may be sufficient in number so that the combination of their communication ranges covers the entire grocery store. Each access point 748, 750, 752 may only communicate with a mobile customer interface module 754 when such a module 754 is located within the communication range of that particular access point 748, 750, 752, respectively.

In addition, each access points 748, 750, 752 may include an identifier, such as an alphanumeric sequence, which is unique to that particular access point 748, 750, 752, respectively. Therefore, when an access point, for example access point 748, communicates with a mobile customer interface module 754, the access point communicates its identifier to the customer locator module 746. The customer locator module 746 may use the identifier to determine that the mobile customer interface module 754 is located within the communication range of the access point 748, thus locating the customer. Various approaches can be used to locate the mobile device, from IR and Bluetooth beacons, to determine the location of the last scanned item.

Because the Grocery System 700 is able to track the location of a customer, the Grocery System 700 is able to provide individualized interaction with the customer. As discussed above, the individualized interaction may be based in part on the customer model. Further, the timing to convey the individualized interaction with the customer may vary. For example, promotions for all of the items on the predicted shopping list may be provided at the same time. Or, because of the potential to inundate the customer with information, the promotions may be paced from one another, depending on the customer's location in the grocery store. For example, if the customer is in the dairy aisle, promotions relating to any one or all of the dairy items may be provided to the customer.

The Grocery System 700 may further include a transactional data system 720. The runtime transactional data system 720 may include a transactional database 722 and a transactional data collection module 724. The transactional data collection module 724 may include a device, such as a bar code scanner, for identifying the product categories a customer intends to purchase. The transactional data collection module 724 may be located at the grocery stores checkout counter to determine the product categories actually purchased by customer at the end of a particular transaction. The customer may be identified by the transactional data collection module 724 in a variety of ways, such as by scanning a store loyalty card or using biometric identification techniques. Alternately, the transactional data collection module 724 may be located next to or within the access points 748, 750, 752. This allows the Grocery System to identify the product categories a customer is intending to buy during the transaction.

Many of the components of the Grocery System 700 may be implemented in a computer system. For example, the shopping list prediction runtime module 710, individualized application runtime module 730, and portions of the transactional database system 720, such as the transactional database 722, and the customer interface system 740, such as the customer locator module 746 and the customer identification module 742, may be implemented in a computer system.

C. Example of Application to Grocery Store

In practice, predicting grocery shopping lists is interesting as a learning problem because of the sheer number of classes that must be predicted. Abstracting from the lowest product category level—the product level (which includes about 60,000 product categories) to the level of relatively specific product categories that may be useful for grocery lists reduces this number to a degree. However, for real world datasets, the number of classes may be from fifty to a hundred classes per customer, with tens of thousands of regular customers per grocery store.

In general, the metrics used to evaluate the performance of the shopping list predictors per class are the standard recall, precision, accuracy and f-measure quantities. For a set of test examples, recall is defined as the number of true positive predictions divided by the number of positive examples. Precision is defined as the number of true positive predictions over the total number of positive predictions. Accuracy is defined as the number of correct predictions divided by the total number of examples. F-measure is defined as the harmonic mean of recall and precision as defined by the following equation:

$$\frac{2 * recall * precision}{recall + precision} \quad (2)$$

There are many considerations to take into account to obtain an overall measure of performance by which success may be measured when predicting shopping lists for large groups of customers. Typically, in a learning scenario with a large number of classes, the metrics, such as those previously described, may be aggregated in several ways. Microaveraged results may be obtained by aggregating the test examples from all classes together and evaluating each metric over the entire set. An alternative includes microaveraging the results. Microaveraging the results includes evaluating each metric over each class separately, and then averaging the results over all classes. The first alternative tends to produce higher results than the second alternative. This occurs because when the number of classes is large and very unbalanced, the microaveraged results are implicitly dominated by classes with a large number of examples, while the microaveraged results are dominated by classes with a smaller number of examples. Macroaveraging provides a measure of how the shopping list runtime module 320 performs for the majority of customers rather than just those with a large number of transactions.

However, the transactional nature of the transaction datasource makes it possible to aggregate in additional ways. One option would be to aggregate all examples associated with a single customer, obtain results for the metrics discussed previously for each set, and average them ("Customer Averaging"). Customer Averaging shows how the shopping list prediction runtime module 320 performs for the average customer. Although these aggregate sets still unbalanced, given that some customers shop more than others, the average results for Customer Averaging are generally between those of the micro and macroaveraging approaches. Another option is to aggregate on the transaction level ("Transaction Averaging"). Using Transaction Averaging, all the examples from each transaction are aggregated, each metric is calculated, and the results are averaged over all transactions. Transaction Averaging may determine, per trip, how many of the categories that were predicted (in other words, included on the shopping list) were acquired, and how many of the acquired categories were predicted. However, because Transaction Averaging breaks up examples sets within classes, it may be difficult to compare the results of Transaction Averaging with those of the other aggregation techniques.

The shopping list prediction runtime module 320 was tested using data for several thousand customers. The dataset contained transaction data describing the purchases made by over 150,000 customers in a grocery store over two years. From this overall set, 22,000 of the customers shopped between 20 and 300 times, which was a legitimate population for whom to predict shopping lists. This population was sampled to produce a dataset of 2200 customers with 146,000 associated transactions. Because the number of transactions for each customer followed a power law, uniform random sampling to select 10% of the customers would have resulted in a sample skewed towards customers with small number of transactions. To obtain a representative sample, the population was split into deciles along three attributes: total amount spent, total number of transactions, and $$\frac{\text{\# transactions}}{amountspent}.$$

For each set of deciles, 10% of the data was selected with uniform probability from each decile. The 10% samples obtained for each attribute were found to be statistically similar to the other two. Therefore, the final sample used was taken from total amount spent.

The transactional information included, in addition to the attributes described in the previous section, lists of product categories purchased during each transaction. Products were arranged in a hierarchy of product categories, of increasing generality. At a fairly specific level of this hierarchy, the product categories resembled grocery shopping list items. Examples of these product categories included: cheddar cheese, dog food, sugar, laundry detergents, red wine, heavy cream, fat-free milk, tomatoes, and other grocery items. In total, 551 product categories were represented in the dataset forming the set P as defined previously. Customers within the sample bought 156 distinct product categories on average (with a standard deviation of 59). Of these product categories, the set $P_c$ for each customer was restricted to include only the product categories bought during 10% or more of the customer's transactions. Therefore, the average size of $P_c$ for a given c was 48 (with standard deviation of 27.59).

For each transaction for each of the customers in the sample, examples were constructed as described above. The datasets for each category ranged from 4 to about 240 examples. For each class in the resulting dataset, the example sets were split into a training set, which included the first 80% of examples in temporal order, and a test set, which included the last 20%.

The shopping list prediction runtime module 320 was tested a variety of methodologies, including rule-based, machine learning and hybrid approaches. The rule-based methods were run on the test sets to provide consistency in evaluation. For the top n methods, a cutoff of 10 categories was chosen. For the decision tree classifier, C4.5 was used with 25% pruning and default parameterization. For the linear methods, the SNoW learning system was used (see, A. Carlson, C. Cumby, J. Rosen, and D. Roth, "The SNoW learning architecture. Technical Report UIUCDCS-R-99-2101," UIUC Computer Science Department, May 1999). SNoW is a general classification system incorporating several linear classifiers in a unified framework. The classifiers were trained with two (2) runs over each training set.

Results of the test performed on the shopping list prediction runtime module 320 using the various approaches are shown in Tables 1 and 2 below, broken down in terms of the transaction and customer averaging methods.

TABLE 1

|  | Recall | Prec | F-Measure | Accuracy |
| --- | --- | --- | --- | --- |
| Random | .19 | .20 | .19 | .65 |
| Sameas | .26 | .26 | .26 | .70 |
| Top-10 | .37 | .35 | .36 | .59 |
| Perceptron | .38 | .26 | .31 | .65 |
| Winnow | .17 | .36 | .23 | .79 |
| C4.5 | .22 | .34 | .24 | .77 |
| Hybrid-Per | .59 | .28 | .38 | .53 |
| Hybrid-Win | .43 | .36 | .39 | .65 |
| Hybrid-C4.5 | .46 | .35 | .40 | .62 |

TABLE 2

|  | Recall | Prec | F-Measure | Accuracy |
| --- | --- | --- | --- | --- |
| Random | .21 | .19 | .20 | .65 |
| Sameas | .25 | .29 | .27 | .70 |
| Top-10 | .41 | .33 | .37 | .65 |
| Perceptron | .40 | .27 | .32 | .66 |
| Winnow | .17 | .38 | .24 | .79 |
| C4.5 | .25 | .28 | .26 | .70 |

TABLE 2-continued

|  | Recall | Prec | F-Measure | Accuracy |
| --- | --- | --- | --- | --- |
| Hybrid-Per | .60 | .27 | .37 | .55 |
| Hybrid-Win | .44 | .32 | .37 | .64 |
| Hybrid-C4.5 | .48 | .34 | .40 | .62 |

Figure 8:
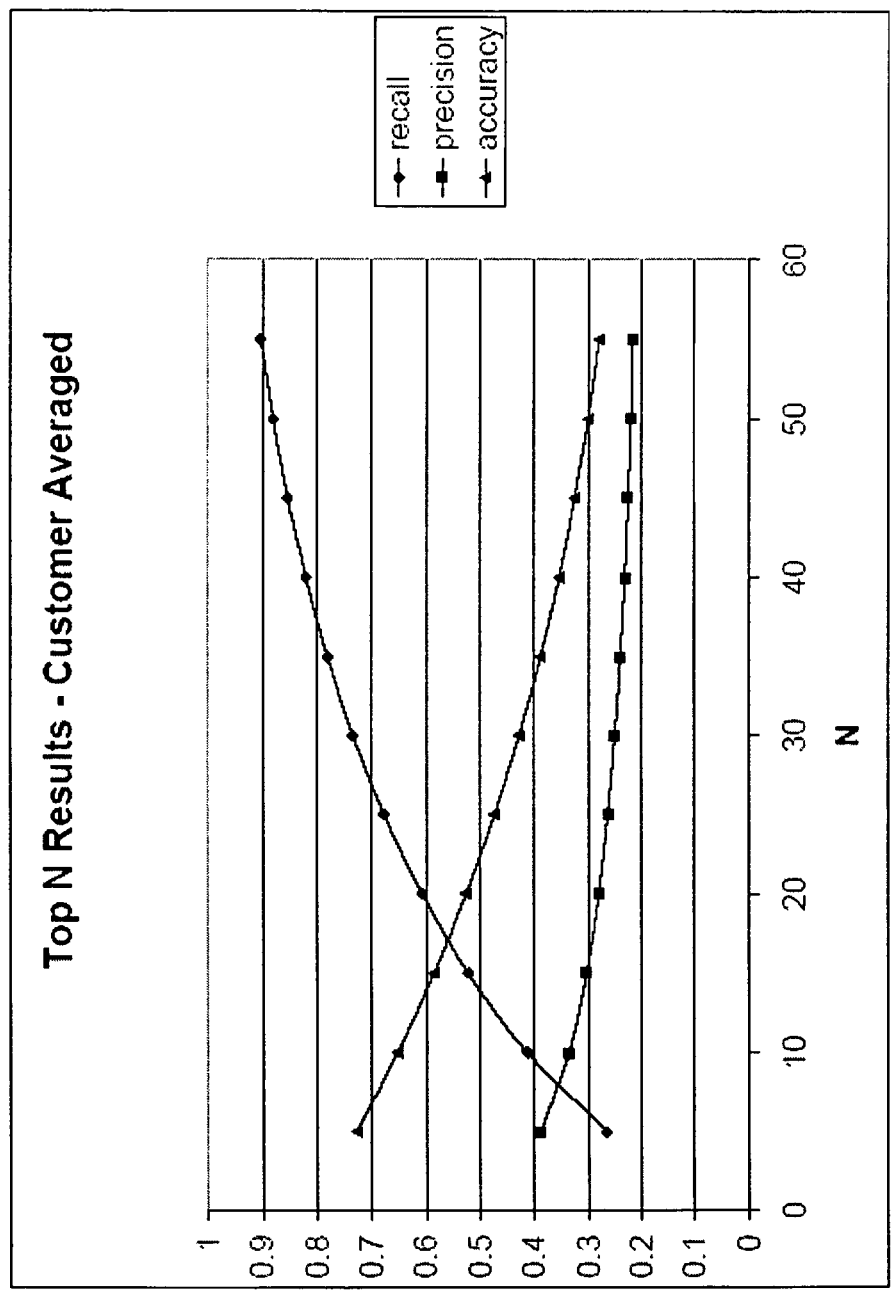
FIG. 8 is a graph of results for a top N results method-customer averaged.
Figure 9:
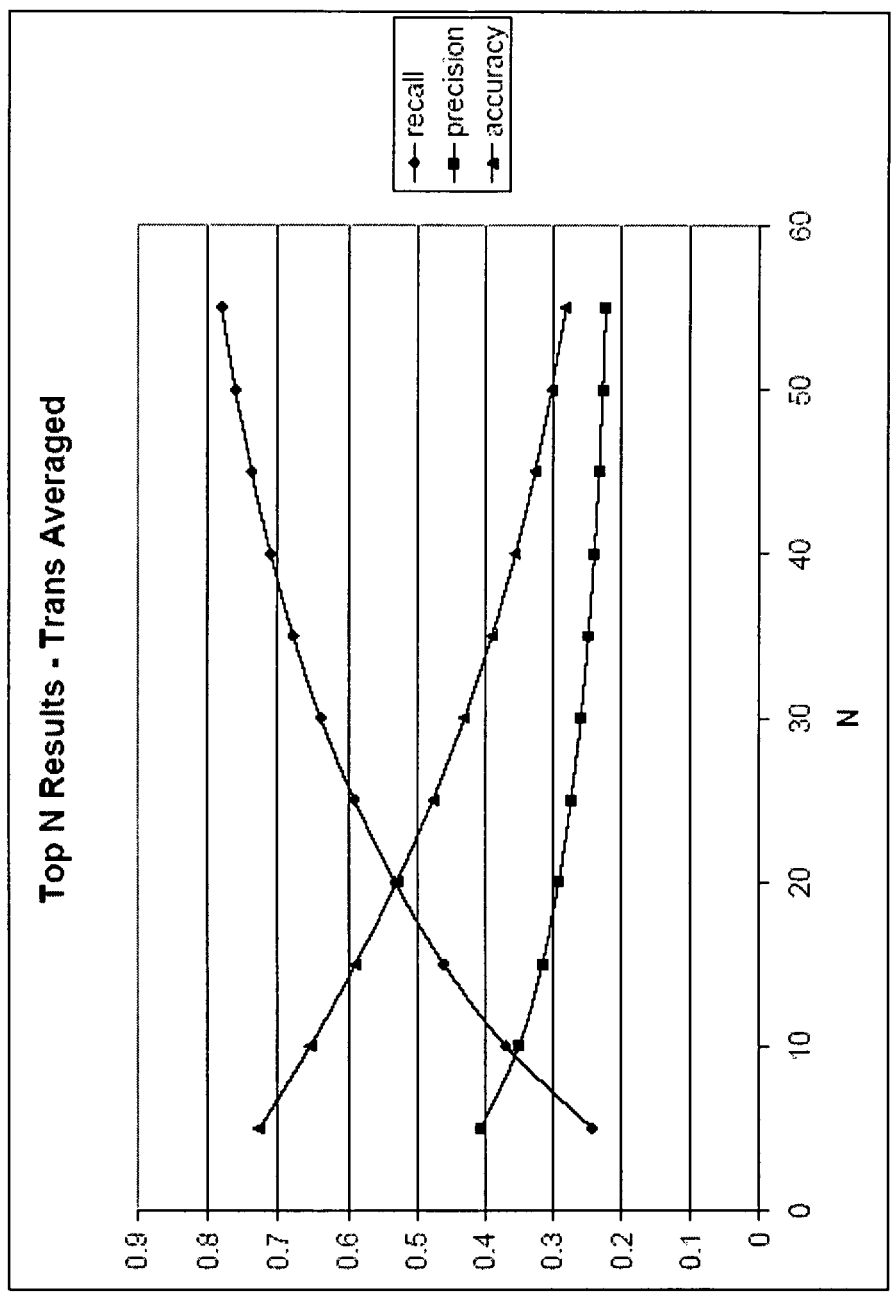
FIG. 9 is a graph of results for a top N results method-transaction averaged.

FIGS. 8 and 9 include graphs that show the performance of the shopping list prediction runtime module 320 using the top-n approach for different values of n.

Figure 10:
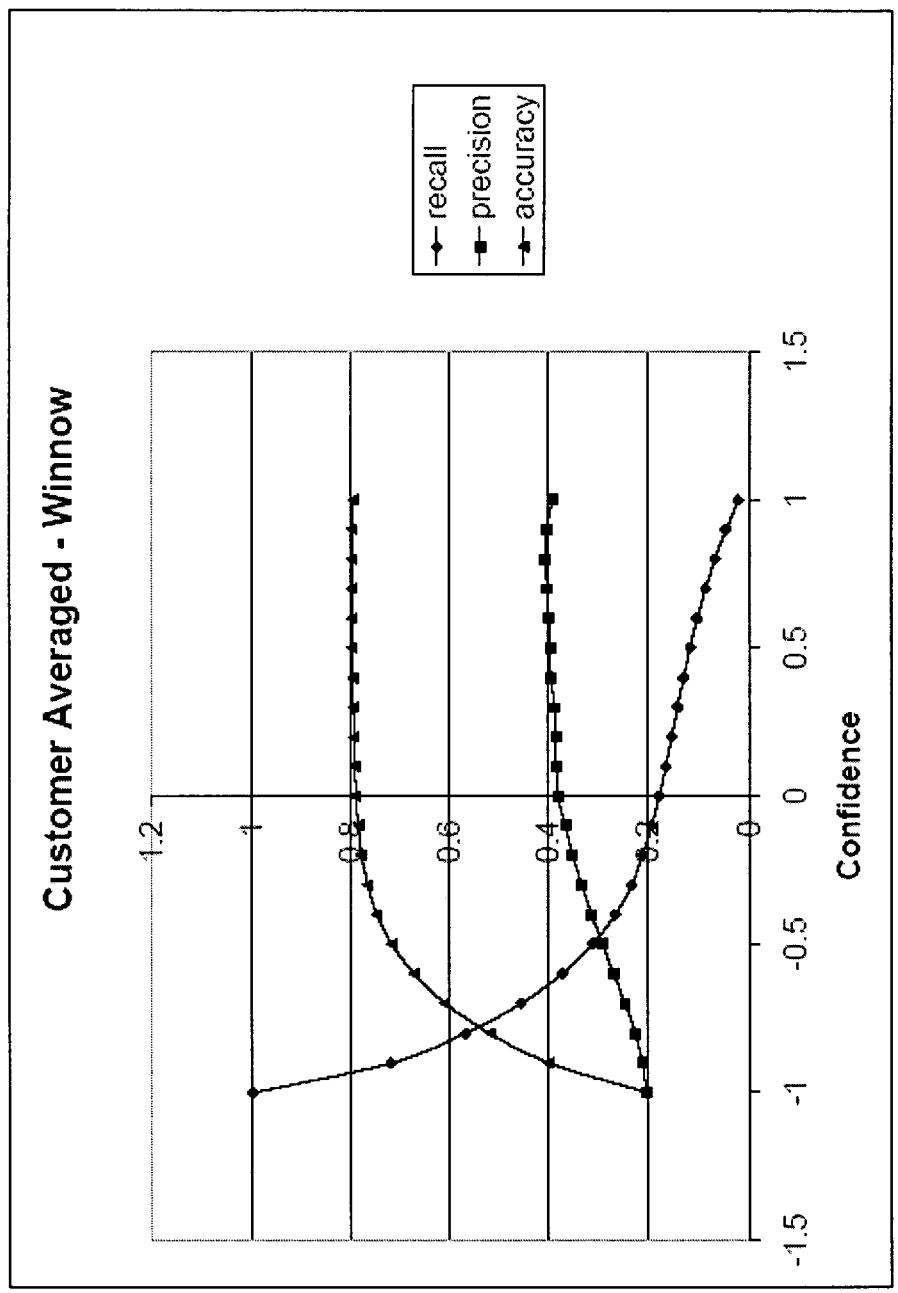
FIG. 10 is a graph of linear classifier performance at confidence thresholds for a customer averaged method-Winnow.
Figure 11:
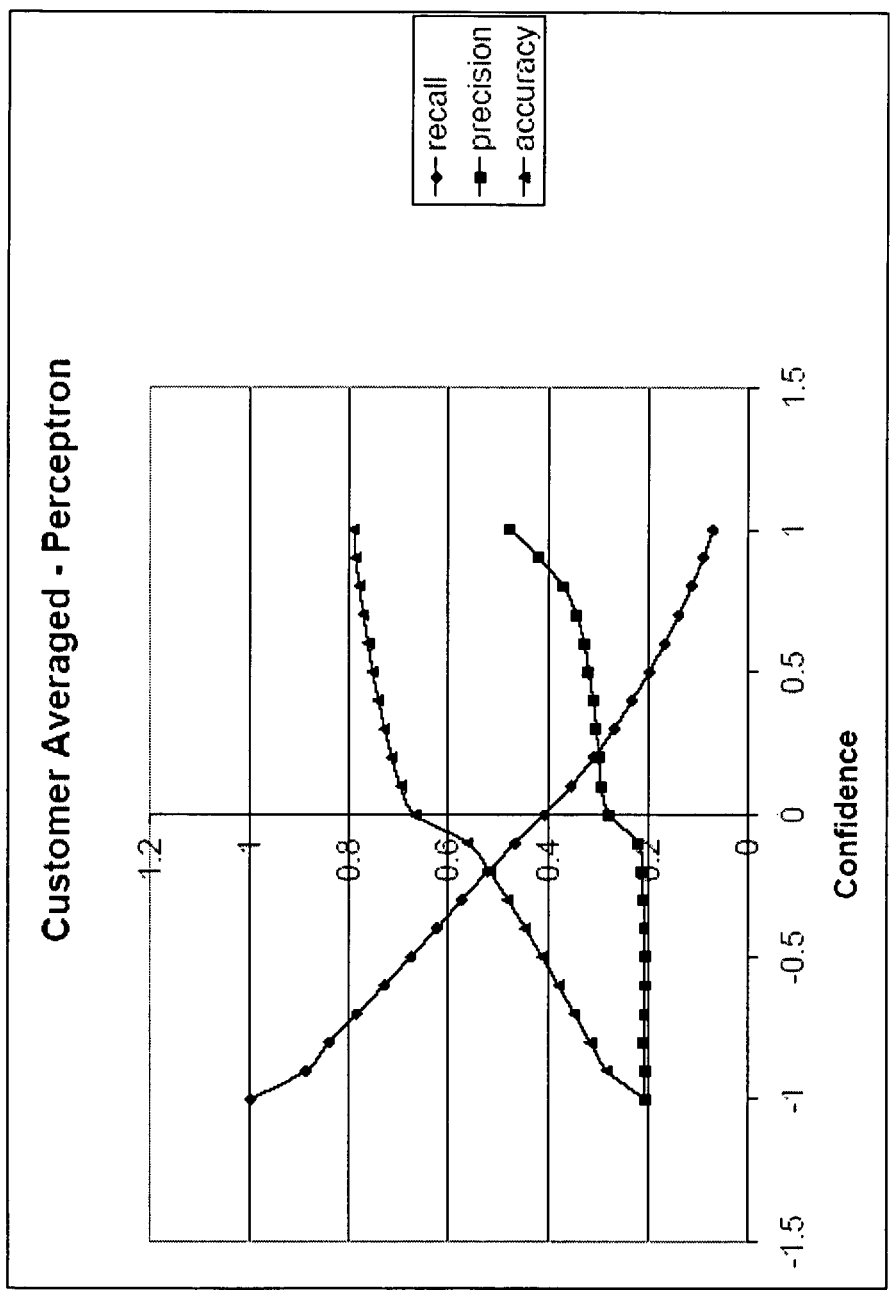
FIG. 11 is a graph of linear classifier performance at confidence thresholds for a customer averaged method-perception.

For the shopping list prediction runtime module 320 using the linear classification methods, the activation values output by the shopping list prediction runtime module 320 were normalized to produce a confidence score for each class. Then, a threshold different from the threshold used in training was chosen to test the shopping list prediction runtime module 320 performance. FIGS. 10 and 11, show the performance of the shopping list prediction module 110 using Winnow and Perceptron classifiers at different confidence thresholds. The activations were normalized to confidence values between −1 and +1, with the original training threshold mapped to 0.

As previously discussed, one application for predicting shopping lists is to reclaim forgotten purchases. However, the dataset used in testing did not include information on the instances in which categories were forgotten. Further, assumptions about the instances in which forgetting had occurred were not made. However, these methodologies should be somewhat robust to label noise as long as they are not overfitting the data. In order to estimate this robustness and determine the value of the predicted forgotten purchases, some assumptions are made about the distribution of the instances of forgotten purchases and noisy label values were corrected in the test data. Training was performed on the noisy data, and then an evaluation was performed on the corrected test data, to demonstrate an increase in the number of true positive predictions without a serious increase in false negatives.

The manner to estimate noisy labels in the test data to correct is described as follows. First, for each class $p \in P_c$ for a given customer, the mean $\mu$ and standard deviation $\sigma$ of the replenishment interval $i^2$. were determined. Next, examples for which $i \geq \mu + c*\sigma$ or for different constants c were identified. For each of these examples that have negative labels, a determination as to whether any example within a window of k following transactions was positive. Each of these examples was estimated to be an instance of forgetting, with noisy negative labels.

To evaluate the robustness of the shopping list prediction runtime module 320 predictors to this noise, each noisy negative label was changed to be positive, and each classification method was re-evaluated on the modified test data. The transaction averaged results of this evaluation are summarized in Table 3 below for $c=1^3$.

TABLE 3

|  | Recall | Prec | F-Measure | Accuracy |
| --- | --- | --- | --- | --- |
| Random | .20 | .21 | .20 | .64 |
| Sameas | .23 | .28 | .26 | .69 |
| Top-10 | .37 | .36 | .37 | .65 |
| Perceptron | .42 | .31 | .36 | .61 |
| Winnow | .16 | .40 | .23 | .75 |
| C4.5 | .22 | .39 | .28 | .73 |
| Hybrid-Per | .60 | .32 | .42 | .54 |
| Hybrid-Win | .43 | .41 | .42 | .65 |
| Hybrid-C4.5 | .46 | .38 | .42 | .62 |

II. Promotion Planning

As discussed above, one aspect of a retail establishment's business is promotion planning. The retail establishment may wish to improve its promotion planning in one of several ways including selection of the parameters of the promotion and simulating the promotion. Promotion planning may include reviewing and reasoning about the goals, parameters, and results of a promotion for a single product, while simulating these promotions for each customer using their personal profile. This may be accomplished via the promotion planning method and system described below.

The method and system allow a user to modify the purposes of each promotion using a set of high-level goals, which are mapped to the practical parameters of a sale to produce general rules of the type mentioned above. By simulating the effects of a promotion on each customer targeted with respect to specific retailer/manufacturer goals, the method and system allow a completely new type of pricing model for trade promotions, bringing the pay-for-performance philosophy to a domain that has traditionally been administered on a very crude basis. The method and system also offers the advantage of building and simulating sets of rules collectively and evaluating their interactions rather than manually in isolation. Below is describe the operations of the method and system from goal selection, to optimization, simulation, and pricing.

With regard to goals, promotion planning is often difficult in terms of trying to select the parameters of the promotion which may meet the goals of the promotion. Examples of general goals include, but are not limited, to brand, revenue, lift, and market share. Brand goals are generally related to a specific brand, and can include: (1) brand switches (e.g., the number of switches to the brand which is subject to the promotion); (2) brand extensions (e.g., number of purchases of a product which is related to a brand); (3) new trials of a product; and (4) loyalty rate for existing customers. Revenue goals may be classified as: (1) short term revenues (increase in percentage or amount of sales over a predetermined period, such as the following 2 weeks); (2) long term revenues (increase in percentage or amount of sales over a predetermined period, such as the following 3 months); (3) trend; and (4) brand revenue (revenue for a brand as a whole, such as the entire Ivory® line of products, or revenue for a specific brand product, such as Ivory® soap). Lift goals may relate to an increase in volume of current sales without regard to revenue. Market share relates to an increase in percent of the market share relative to another party in the market.

The parameters of the promotion may include any one or all of the following: (1) the duration of the promotion (such as the number of day, weeks, months, etc.); (2) the discount applied (such as a percentage reduction, a fixed amount reduced from the price, a sale price, etc.); (3) any values for the attributes of the customer model (such as ranges of values for behavior, brand loyalty, wallet share, price sensitivity, promotion sensitivity, product category substitution, basket variability, frequency of shopping). For example, attributes may include any one or all of the following: (1) minloy, maxloy, which may be the minimum and maximum loyalty scores for the consumers in the target group; (2) minhoard, maxhoard, which may be the minimum and maximum hoarding scores for the consumers in the target group; (3) minsensitivity, maxsensitivity, which may be the minimum and maximum price sensitivity scores for the consumers; and (4) mintrial, maxtrial, which may be the minimum and maximum new trial rate scores for the consumers.

Figure 12:
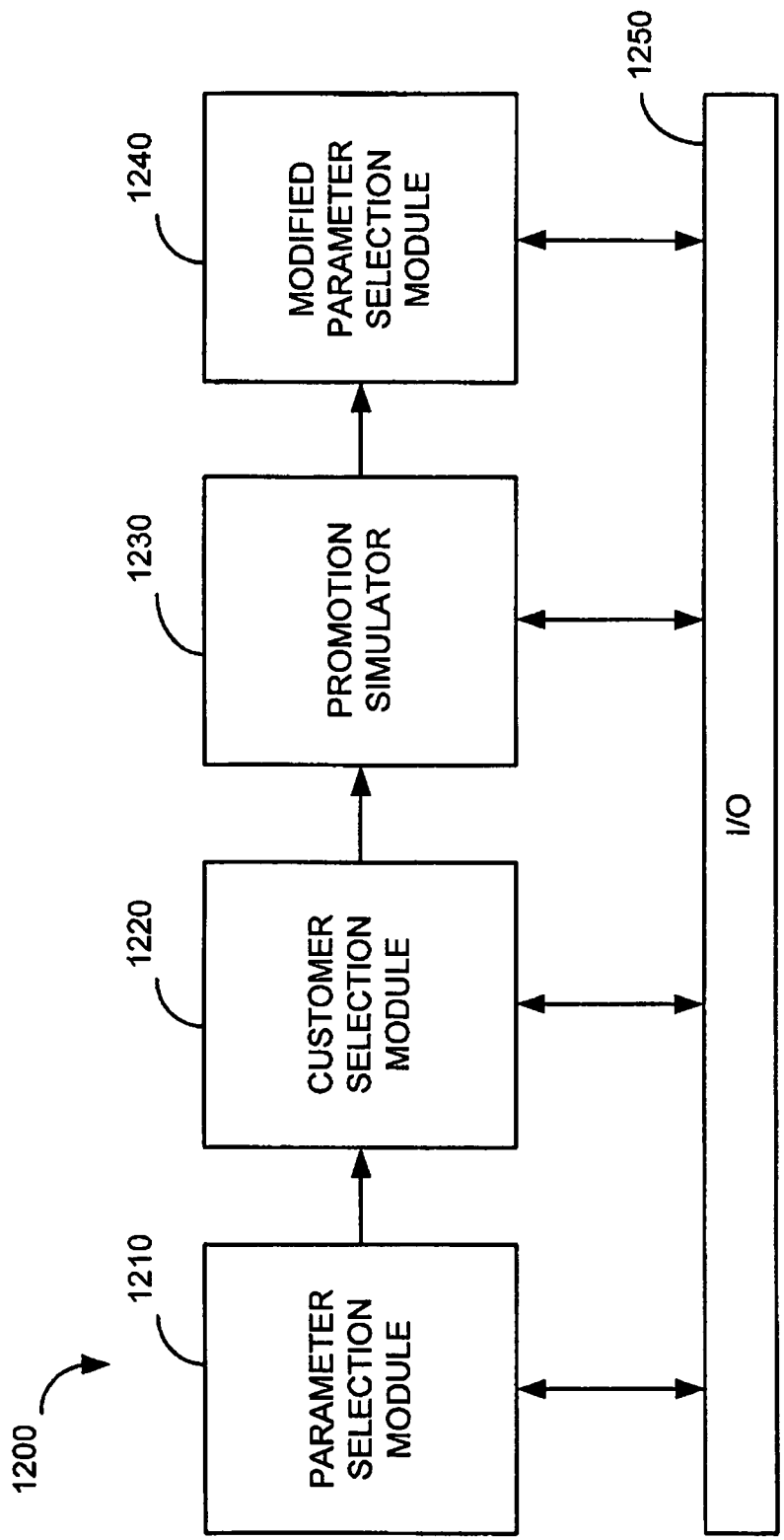
FIG. 12 is a block diagram of a promotion planning system.

Referring to FIG. 12, there is shown a block diagram of a promotion planning system 1200. The promotion planning system 1200 includes an initial parameter selection module 1210, which may select initial parameters for the promotion. Instead of using an ad-hoc process of selecting parameters for a promotion, one aspect of the invention is to derive the parameters from optimization of the goals of the promotion. As discussed above, there may be a variety of goals of a promotion. The goals of the promotion may be entered via an input/output device 1250, and transmitted to the initial parameter selection module 1210.

The following is a representation of the promotion as a function of the goals of the promotion and the parameters of the promotion:

$$f(x_1 \ldots x_n) = c_1 \cdot \text{brand}(x_1 \ldots x_n) + c_2 \cdot \text{lift}(x_1 \ldots x_n) + c_3 \cdot \text{market}(x_1 \ldots x_n) + c_4 \cdot \text{rev}(x_1 \ldots x_n) \quad (3)$$

with $x_1 \ldots x_n$ being the parameters for the promotion, and the coefficients $c_1$, $c_2$, $c_3$, and $c_4$ represent the coefficients for the brand, lift, market and revenue goal functions. The coefficients may comprise weights of the goals relative to one another. For example, the function for the brand goal may be represented as a function of the sub-goals and the parameters of the promotion:

$$\text{brand}(x_1 \ldots x_n) = b_1 \cdot \text{switch}(x_1 \ldots x_n) + b_2 \cdot \text{ext}(x_1 \ldots x_n) + b_3 \cdot \text{trials}(x_1 \ldots x_n) + b_4 \cdot \text{loyalty}(x_1 \ldots x_n) \quad (4)$$

where the coefficients $b_1$, $b_2$, $b_3$, and $b_4$ represent the values for the sub-goals of brand switches, brand extensions, new trials, and loyalty. Further, the coefficients may represent the weights of the sub-goals relative to one another. For example, the function for the switch sub-goal may be represented as:

$$\text{switches}(x_1 \ldots x_n) = \frac{\left(\frac{\text{duration}}{\text{avg\_repl}} - \text{conv\_rate} \cdot \frac{(\min loy + \max loy)}{2}\right) \cdot \text{custs}(\min loy, \max loy)}{\text{duration}^2} \quad (5)$$

where avg_repl is the average replenishment rate of customers who buy the target category, and conv_rate is the number of promotion instances needed to switch a customer with 100% loyalty to a competing brand (estimated from training transactions). The custs quantity is estimated by assuming the number of customers is distributed normally with respect to brand loyalty, and using the normal cumulative distribution function:

$$p(x) = \frac{1}{\sigma\sqrt{2\pi}} \int_{\frac{\min loy}{\sigma}}^{\frac{\max loy}{\sigma}} e^{\frac{-(t-\mu)^2}{2\sigma^2}} dt \quad (6)$$

where $\mu$ is the mean loyalty of the customers and $\sigma$ is the standard deviation. The set of constraints C may contain equality/inequality constraints over any of the input variables $x_1 \ldots x_n$ to express rules such as promotions on product p may never exceed 50 days in duration.

Functions for the other sub-goals of the brand goal (ext, trials, and loyalty) and sub-goals for the lift, market, and revenue goals may similarly be obtained.

B. Optimization

The initial parameter selection module 1210 may optimize the objective function for the promotion $f(x_1 \ldots x_n)$ for any one, some, or all of the promotion parameters $x_1 \ldots x_n$. The optimization may be performed using non-linear optimization. Further, the optimization may be a local optimization or a global optimization. In addition to the goals, some of the parameters of the promotion may be given ranges. For example, the duration of the promotion may be given a range of 1 week to 10 weeks, and the optimization may optimize the duration parameter to within the prescribed range.

The initial parameter selection module 1210 may thus output to the customer selection module 1220 suggested parameters for the promotion. The suggested parameters may include various attributes, such as brand loyalty. The customer selection module 1220 may access the available consumer profiles, discussed above, for the retail establishment and select a subset of available consumer profiles based on the suggested parameters. For example, if a customer has attributes within the ranges prescribed for (1) minloy, maxloy; (2) minhoard, maxhoard; (3) minsensitivity, maxsensitivity; and (4) mintrial, maxtrial, the customer may be part of the subset.

More specifically, let $x_1 \ldots x_n$ be the parameter variables described above. A hierarchical multi-objective optimization problem may be defined of the following form:

$$\arg\max_{x_1 \ldots x_n} f(x_1 \ldots x_n) = \arg\max_{x_1 \ldots x_n} \begin{bmatrix} f_{brand}(x_1 \ldots x_n) \\ f_{revenue}(x_1 \ldots x_n) \\ f_{lift}(x_1 \ldots x_n) \\ f_{brand}(x_1 \ldots x_n) \end{bmatrix} \quad (7)$$

$$wrt\ C = \{c_1 \ldots c_k\}$$

where the set C of constraints on $x_1 \ldots x_n$ are given by the user. $f(x_1 \ldots x_n)$ is reformulated as a weighted sum:

$$f(x_1 \ldots x_n) = g_1 \cdot f_{brand}(x_1 \ldots x_n) + g_2 \cdot f_{revenue} + (x_1 \ldots x_n) + g_3 \cdot f_{lift}(x_1 \ldots x_n) + g_4 \cdot f_{mshare}(x_1 \ldots x_n) \quad (8)$$

Each term in this sum may itself be expressed as a weighted sum, yielding a single objective function. The subobjectives may be as follows:

$$f_{brand}(x_1 \ldots x_n) = b_1 \cdot switches(x_1 \ldots x_n) + \quad (9)$$
$$b_2 \cdot extensions(x_1 \ldots x_n) +$$
$$b_3 \cdot newtrials(x_1 \ldots x_n) +$$
$$b_4 \cdot loylevel(x_1 \ldots x_n)$$

$$f_{revenue}(x_1 \ldots x_n) = r_1 \cdot shortrev(x_1 \ldots x_n) + \quad (10)$$
$$r_2 \cdot longrev(x_1 \ldots x_n) +$$
$$r_3 \cdot brandrev(x_1 \ldots x_n)$$

$$f_{lift}(x_1 \ldots x_n) = l_1 \cdot shortlift(x_1 \ldots x_n) + \quad (11)$$
$$l_2 \cdot longlift(x_1 \ldots x_n) +$$
$$l_3 \cdot brandlift(x_1 \ldots x_n)$$

$$f_{mshare}(x_1 \ldots x_n) = m_1 \cdot prodshare(x_1 \ldots x_n) \quad (12)$$

To solve the non-linear optimization task, a sequential quadratic programming procedure may be employed.

B. Simulation

The subset of consumer profiles may then be output to the promotion simulator 1230. The promotion simulator 1230 may simulate the promotion using the subset of the consumer profiles. Specifically, because the consumer profiles are individualized and personalized, the profiles better represent the consumers. The promotion may be "offered" to the subset of customers via the subset of customer profiles, thereby simulating the results. Therefore, the results of the simulation using the consumer profiles may be more accurate.

The system may show a user simulations of promotional results directly related to the goals of the promotion, by creating promotional rules based off the parameters described above and applying these rules iteratively to each customer.

Heuristic measures may then be applied to gauge the results related to each goal defined above. These heuristics, while derived from the customer transactional data, may not be systematically evaluated in terms of their empirical accuracy until a true user test can be arranged. Many other sets of heuristics or learned models could be created to explain the results. For each heuristic $h_i$ described below, $h_i$ is summed over all customers to produce the final simulated result.

1. Brand Heuristics $$h_{switch} = \begin{cases} result\_prob & \text{if } numvisits \geq loy_{other} \cdot conv\_rate \\ 0 & \text{else} \end{cases} \quad (13)$$

$$h_{extensions} = \begin{cases} result\_prob & \text{if } numvisits \geq (1 - loy_{this}) \cdot conv\_rate \\ 0 & \text{else} \end{cases} \quad (14)$$

$$h_{newtrials} = \begin{cases} result\_prob & \text{if } numvisits \geq \\ & (loy + newtrial) \cdot conv\_rate \\ 0 & \text{else} \end{cases} \quad (15)$$

$$h_{loyalty\_level} = sens(discount) * loy\_change * num\_visits \quad (16)$$

where result_prob=sens(discount)·(base−discount). sens (discount) may be a price sensitivity function, which may be a distribution that may be calculated for each customer and each product over all of the different price points giving probability for purchasing the product at a certain discount. In the above heuristics, the average replenishment rate per customer repl_rate is used to calculate the quantity numvisits as $$\frac{duration}{repl\_rate}.$$

The conversation rate conv_rate may be a constant estimated as an average of the number of visits by the customer to obtain a conversion for the associated result. For example, the conv_rate for switching may be the number of visits to switch a customer with 100% loyalty ($loy_{other}$) to another brand. Therefore, when the loyalty brand is lower, fewer visits are necessary for a switch. As another example, the conv_rate for extensions is the number of visits necessary to obtain a brand extension for a customer who is 100% loyalty to the brand ($loy_{this}$) subject to the extension. Still another example, the conv_rate for extensions is the number of visits necessary to convert a customer with 100% loyalty to any brand (loy). For h, loy_change is the average difference in loyalty seen for this customer after utilizing a promotion for the given product in the past, scaled by the probability of their taking the promotion.

2. Revenue Heuristics

The revenue heuristics may encode the relative increase or decrease in revenues in the short-term (promotion duration) and long term (e.g., 4 replenishment rates after promotion).

$$h_{short\_term} = (base - discount) \cdot sens(base - discount) \cdot num\_visits \quad (17)$$

$$h_{long\_term} = \begin{cases} hoarding\_score & \text{if } sens(base - discount) > .5 \\ 0 & \text{else} \end{cases} \quad (18)$$

where base is the base price for the product, discount is the discount offered, the discount price is base−discount, sens (base−discount) is the price sensitivity to the discount price, and hoarding_score is the difference in revenue over next several replenishment cycles (i.e., difference in the baseline revenue for this customer). The brand revenue heuristic may be evaluated by summing either the short or long term revenue heuristics over all products in the brand. Therefore, the revenue heuristics are an indicator of the incremental revenue (i.e., difference in revenue between what is expected with and without promotion), both in the short term and long term.

3. Lift Heuristics $$h_{\text{short\_term}} = (sens(\text{base} - \text{discount}) - sens(\text{base})) \cdot \text{num\_visits} \quad (19)$$

$$h_{\text{long\_term}} = (sens(\text{base} - \text{discount}) - sens(\text{base})) \cdot \frac{\text{hoarding\_score}}{\text{base}} \quad (20)$$

where the sens(base−discount) is the price sensitivity of the customer to the discount price, and the sens(base) is the price sensitivity of the customer to the base price. The brand life heuristic may be evaluated by summing either the short or long term lift heuristics over all products in the brand. Therefore, the lift heuristics are an indicator of the incremental lift (i.e., difference in volume between what is expected with and without promotion), both in the short term and long term.

4. Market Share Heuristics $$h_{\text{market\_share}} = h_{\text{switches}} + \frac{h_{\text{extensions}}}{\text{avg\_ext}} \quad (21)$$

where avg_ext is the average number of extensions over all the brands in the category. $h_{market\_share}$ is then the estimated increase/decrease in market share in terms of loyal customers over the next promotion period.

Figure 13:
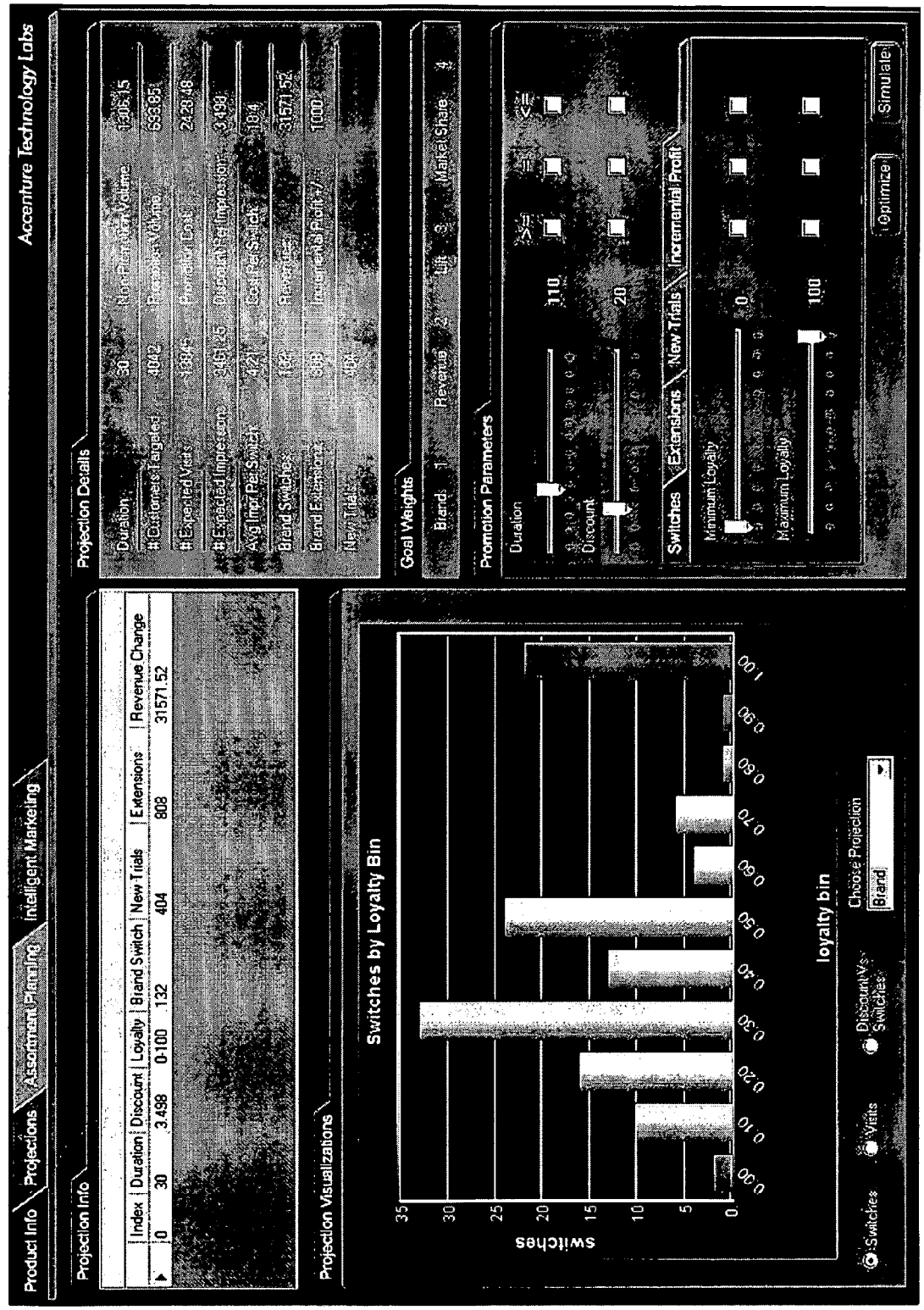
FIG. 13 shows a projection screen illustrating optimization and promotion simulation of the promotion planning system.

FIG. 13 shows an example of an output from the promotion simulator 1230. The output is for a specific brand of whisky. As discussed above, the promotion simulator may be for any product category. The projection details show one representation of the results of the simulation. The projection details may include, but are not limited to: (1) the duration of the promotion; (2) the number of customers targeted by the promotion (i.e., the subset of the customers); (3) the number of expected visits (based on the frequency of visits attribute for the customer, the last visit of the customer, and the duration, the number of visits may be calculated for each customer in the subset and summed); (4) the number of expected impressions (i.e., the number of times consumers are presented with the promotion); (5) the average number of impressions per switch; (6) the brand switches because of the promotion; (7) the brand extensions because of the promotion; (8) the new trials of the brand; (9) the non-promotion volume (i.e., the number of units of the brand sold which are not tied to the promotion); (10) the promotion volume (i.e., the number of units of the brand sold which are tied to the promotion); (11) promotion cost (i.e., the total cost of the discounts for the promotion volume; (12) the discount per impression; (13) the cost per switch (i.e., the promotion cost divided by the number of brand switches); (14) the revenues from the promotion; and (15) the incremental revenue for a predetermined number of replenishment cycles due to the promotion. Further, the incremental lift for a predetermined number of replenishment cycles due to the promotion may be determined.

The average impressions required per brand switch may be calculated in a variety of ways. One way is based on data from acceptance and rejection of previous offers. If the previous offer is for a similar product and/or a similar promotion, the average impressions per switch may be used. Or, the data for a similar product and/or a similar promotion may be used to extrapolate an equation that is a function of the amount of discount offered and the number of times the promotion is offered. Another way is to assume a functional form, such as linear or quadratic, for the average impressions required per brand switch. For example, the average impressions required per brand switch may be a linear equation and be a function of brand loyalty (with lower brand loyalty requiring fewer average impressions per switch and higher brand loyalty requiring more average impressions per switch). FIG. 13 also shows a graph of a histogram of an estimate of the number of switches based on the different loyalty bins. Though FIG. 13 depicts an estimate, the fee charged for the promotion may be based on whether a person accepts the promotion (e.g., purchases the product) and what is the loyalty attribute of the person.

Given the output of the promotion simulator 1230, the parameters of the promotion may be modified and the simulation may be executed with the modified parameters. The selection of the modified selection module may be performed manually, or may be performed by the modified parameter selection module 1240. For example, the duration of the promotion may be modified and the simulation may be re-executed. The output of the re-executed simulation may thereafter be analyzed manually or automatically. Thus, the selection of parameters and promotion simulation may iterate multiple times in order to select improved or optimal parameters for a promotion.

Figure 14:
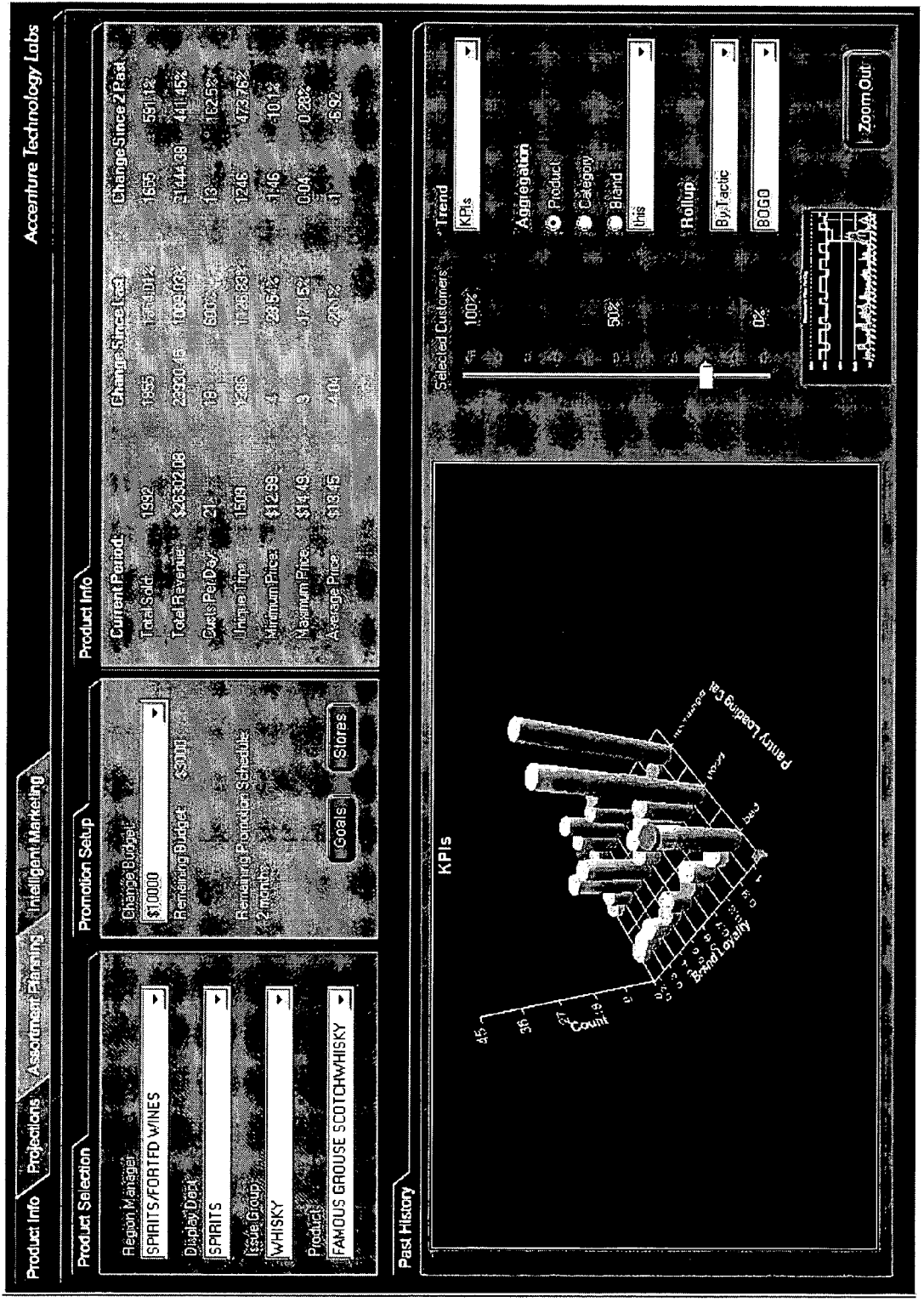
FIG. 14 shows a projection screen illustrating mechanism for viewing results of past promotions.

Further, the output of the promotion simulator may be compared with actual results from past promotions. FIG. 14 shows a projection screen illustrating mechanism for viewing results of past promotions. As shown in FIG. 14, the actual results from promotions for periods may be shown, such as the current period (designated under Product Info as "Current Period"), the period prior to the current period (designated as "Change Since Last"), and two periods prior to the current period and the (designated as "Change Since 2 Past"). Further, a graph may be generated which graphs the actual results based on any attributes of the customers. For example, a graph of the pantry loading attribute and brand loyalty attribute is shown for the current period. The actual results of past promotions may be examined along side the results from the promotion simulator, thereby comparing the actual versus predicted. Any one or all of the goals or parameters of the promotion may be modified based on the comparison.

Finally, planning promotions based on individual models using the simulation and optimization techniques discussed allows retailers to evaluate the costs of such promotions with much greater efficiency. In addition, it allows manufacturers to pay for palpable business results in terms of new customers, enhanced loyalty, and incremental revenue and lift. Any retailer utilizing the system then has a distinct advantage in bidding for promotional dollars from a manufacturer interested in paying for direct performance.

III. Inventory Control

As discussed above, another aspect of a retail establishment's business may include inventory control. The retail establishment may wish to improve its management of inventory to reduce the amount of inventory while still maintaining sufficient inventory for the retail establishment's customers. Reducing the amount of items in inventory may reduce costs.

Using the promotion simulator and the customer models described above, the retail establishment may predict the amount of a product category that will be purchased in an upcoming predetermined period, such as the number of items of a specific brand or a brand family. For example, a retail establishment wishes to estimate approximately the number of ½ gallons of Minute Maid® orange juice purchased the next two weeks. This estimate may be calculated whether or not a promotion is run.

If a promotion is run during the predetermined period, the parameters of the promotion, used for input to the promotion planning module, may be known. For example, the duration of the promotion, the discount for the promotion, the customers targeted for the promotion, the customers not targeted for the promotion, etc., may be known. Further, in simulating the estimate, all of the potential customers of the retail establishment may be accounted for in determining the estimate. To account for all of the potential customers, customer models may be used for each potential customer of the retail establishment. Typically, at least a portion, but not all, of a retail establishment's customers are in the retail establishment's loyalty program. If a customer is in the loyalty program, there may be sufficient data to generate a customer model for the particular customer. For those customer's who are not in the loyalty card program and therefore do not have a customer model, an average customer model may be assigned to these customers. For example, if there are 1000 potential customers for a retail establishment, a subset of the 1000 potential customers (such as 800 customers) may have individual customer profiles. Customers who do not have an individual profile are assigned an "aggregate" customer model. The aggregate customer model may be derived from data which is not used in other customer models. In the present example of 1000 customers, the data for the remaining 200 customer may be used to statistically derive the aggregate customer model. Therefore, the promotion simulation may be run with a customer profile for each customer to determine the amount of the product category purchased due to the promotion and the amount of the product category purchased not due to the promotion. Typically, a customer may not have an individual customer model where the customer does not have sufficient data to extrapolate the individual model (e.g., the customer just started the loyalty program) or the customer does not wish to identify himself or herself to the retail establishment.

Based on those customers who have individual customer models and those customers who are ascribed the average customer model, a subset of the customers who receive the promotion and a subset of customers who do not receive the promotion may be determined. After the subsets are determined, a simulation may be run with parameters describing the next two weeks of any discounts or advertising for ½ gallons of Minute Maid® orange juice. The output of the simulation may include a number of units of ½ gallons of Minute Maid® orange juice sold due to the promotion and a number of units of ½ gallons of Minute Maid® orange juice sold not due to the promotion. Based on this estimate, the inventory may be controlled so that a sufficient amount of ½ gallons of Minute Maid® orange juice is in stock in the upcoming period.

If no promotion is run during the predetermined period, the promotion planning module discussed above may still be used. The parameters used for input for the promotion planning module include the duration, which may be the predetermined period and the amount of promotion, which is zero. Further, purchases for all customers, regardless of brand loyalty to the product category are sought. Therefore, the entire range of brand loyalty to the product category is input to the promotion simulator so that all customer models are accounted for in the simulation. Moreover, each potential customer of the retail establishment may be accounted for using either individual customer models or average customer models, as discussed above. Since all purchases for the product category are sought, all of the customer models available may be used for the simulation.

Alternatively, the sub-model for the shopping list predictor may be used. As discussed above, the shopping list predictor may use various statistical analyses to determine a probability that a particular customer may purchase a product category. For example, based on analysis of previous customer transactions, the shopping list predictor may have a 0.8 probability that the customer will purchase one ½ gallon of Minute Maid® orange juice. Given the customer's frequency of shopping attribute and give the shopping list sub-model, a prediction may be made for a specific customer whether (and how much) the customer will purchase of the product category in the predetermined period. These calculations may be performed for each customer with a customer model, and the number of the product category summed for all of the customers with customer models. Further, for the customers of the retail establishment who do not have customer models, an average customer model may be used. Specifically, an average shopping list predictor sub-model may be derived for the product category for an average customer using transaction data for all customers who do not have a customer model (i.e., data for previous transactions for the product category for all customers who do not have a customer model). Using customer models for all of the customers of a retail establishment (i.e., using individual customer models for customers who have them and using average customer models for customers who do not have individual models), the estimate for the number of a product category purchased in a predetermined period may be estimated.

Additionally, the simulator and the customer models described above may be used to determine the effect of removing an item or adding an item to a retail establishment. If an item is currently being sold by a retail establishment, the simulator and the customer models may predict the potential revenue lost or gained by removing the item. For example, the simulator may suggest whether customers will purchase a lower or higher margin product, will stop purchasing other items at the retail establishment, or will stop purchasing items altogether. Conversely, if an item is not currently being sold by a retail establishment, the simulator and the customer models may predict the potential revenue lost or gained by adding the item for sale by the retail establishment.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:
1. A method comprising:
   generating, for each of a plurality of customers, an individualized customer model using historical transaction data that is associated solely with the customer;
   receiving a user input that indicates a goal of a promotion, wherein the goal identifies a desired long term effect of the promotion that occurs after the promotion has ended, and wherein the goal is selected from the group consisting of: causing long term switches to a brand after the promotion has ended, causing a change in long term revenue after the promotion has ended, and causing a long term change in volume of sales after the promotion has ended;
   automatically selecting a subset of the plurality of customers that are to be targeted with the promotion, based at least on the goal and the customer models;

automatically deriving suggested promotion parameters based at least on the goal for the subset of customers;

simulating, by one or more processors, an effect of the promotion on the subset of customers by applying the suggested promotion parameters to each of the individualized customer models that are associated with the subset of the customers that are selected to be targeted with the promotion; and transmitting a promotional offer to one or more of the customers of the subset based on an outcome of simulating the effect of the promotion on the subset of customers.

2. The method of claim 1, wherein the suggested promotion parameters include a duration of the promotion.

3. The method of claim 1, wherein the suggested promotion parameters are automatically derived further based on suggested customer attributes; and wherein the suggested customer attributes include minimum or maximum customer hoarding scores, or minimum or maximum customer price sensitivity scores.

4. The method of claim 1, further comprising:
outputting a representation of the simulated effect of the promotion with respect to the goal;
modifying, after outputting the representation, the promotion parameters; and
resimulating an effect of the promotion by applying the modified promotion parameters to each of the individualized customer models that are associated with the subset of the customers.

5. The method of claim 4, further comprising outputting a representation of an actual result of a different past promotion in association with the representation of the simulated effect of the promotion.

6. The method of claim 1, wherein the suggested promotion parameters represent parameters that a promotion planning system optimizes to meet the goal.

7. The method of claim 1, wherein the applying the suggested promotion parameters to each of the individualized customer models that are associated with the subset of the customers further comprises:
generating promotional rules based on the suggested promotion parameters; and
applying the rules to the individualized customer models that are associated with the subset of the customers.

8. The method of claim 1, further comprising receiving a user input that indicates a second goal of the promotion, wherein the second goal identifies a desired short term effect of the promotion that occurs during the promotion, wherein the outputting of a representation of the simulated effect of the promotion is also with respect to the second goal.

9. The method of claim 1, wherein the desired long term effect that the goal identifies is an effect occurring at least four replenishment cycles after the promotion has ended.

10. A system comprising:
one or more computers and one or more storage devices storing instructions that are operable, when executed by the one or more computers, to cause the one or more computers to perform operations comprising:

generating, for each of a plurality of customers, an individualized customer model using historical transaction data that is associated solely with the customer;

receiving a user input that indicates a goal of a promotion, wherein the goal identifies a desired long term effect of the promotion that occurs after the promotion has ended, and wherein the goal is selected from the group consisting of: causing long term switches to a brand after the promotion has ended, causing a change in long term revenue after the promotion has ended, and causing a long term change in volume of sales after the promotion has ended;

automatically selecting a subset of the plurality of customers that are to be targeted with the promotion, based at least on the goal and the customer models;

automatically deriving suggested promotion parameters based at least on the goal for the subset of customers;

simulating an effect of the promotion on the subset of customers by applying the suggested promotion parameters to each of the individualized customer models that are associated with the subset of the customers that are selected to be targeted with the promotion; and transmitting a promotional offer to one or more of the customers of the subset based on an outcome of simulating the effect of the promotion on the subset of customers.

11. A non-transitory computer-readable storage device storing software comprising instructions executable by one or more computers which, upon such execution, cause the one or more computers to perform operations comprising:

generating, for each of a plurality of customers, an individualized customer model using historical transaction data that is associated solely with the customer;

receiving a user input that indicates a goal of a promotion, wherein the goal identifies a desired long term effect of the promotion that occurs after the promotion has ended, and wherein the goal is selected from the group consisting of: causing long term switches to a brand after the promotion has ended, causing a change in long term revenue after the promotion has ended, and causing a long term change in volume of sales after the promotion has ended;

automatically selecting a subset of the plurality of customers that are to be targeted with the promotion, based at least on the goal and the customer models;

automatically deriving suggested promotion parameters based at least on the goal for the subset of customers;

simulating an effect of the promotion on the subset of customers by applying the suggested promotion parameters to each of the individualized customer models that are associated with the subset of the customers that are selected to be targeted with the promotion; and transmitting a promotional offer to one or more of the customers of the subset based on an outcome of simulating the effect of the promotion on the subset of customers.

* * * * *